(12) United States Patent
Takayama

(10) Patent No.: US 6,301,067 B1
(45) Date of Patent: Oct. 9, 2001

(54) TAPE CASSETTE AND A TAPE RECORDING APPARATUS

(75) Inventor: Yoshihisa Takayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/284,970

(22) PCT Filed: Sep. 11, 1998

(86) PCT No.: PCT/JP98/04126

§ 371 Date: Sep. 7, 1999

§ 102(e) Date: Sep. 7, 1999

(87) PCT Pub. No.: WO99/14753

PCT Pub. Date: Mar. 25, 1999

(30) Foreign Application Priority Data

Sep. 12, 1997  (JP) .................................................. 9-249148

(51) Int. Cl.[7] ............................. G11B 5/09; G11B 27/02; G11B 15/18
(52) U.S. Cl. .................................. 360/48; 360/13; 360/69
(58) Field of Search .................................. 360/13, 48, 66

(56) References Cited

U.S. PATENT DOCUMENTS 5,852,534 * 12/1998 Ozue et al. ............................ 360/69
6,075,669 * 6/2000 Takayama ............................. 360/69

FOREIGN PATENT DOCUMENTS 9134585   5/1997  (JP) .
9171675   6/1997  (JP) .
9-171676 * 6/1997  (JP) .

* cited by examiner

*Primary Examiner*—Regina Y. Neal
(74) *Attorney, Agent, or Firm*—Jay H. Maioli

(57) ABSTRACT

In a tape cassette including a magnetic tape having a plurality of partitions in which recording data is written, numbers $P_1$, $P_2$, $P_3$, . . . respectively assigned to the partitions are arranged in an ascending order from the beginning end BOT of the magnetic tape toward an end EOD thereof. When a partition is newly appended, the last partition is divided, and the region behind the dividing part is used as a new partition which is assigned by a number $P_{n+1}$ obtained by increasing the maximum number $P_n$ among the partition numbers which existed before the division, so that partitions can be freely appended or deleted.

11 Claims, 28 Drawing Sheets

| | |
|---|---|
| RAW FORMAT ID | 16 BITS |
| LOGICAL FORMAT ID | 8 BITS |
| LOGICAL FRAME ID — LAST FRAME ID | 1 BIT |
| LOGICAL FRAME ID — ECC FRAME ID | 1 BIT |
| LOGICAL FRAME ID — LOGICAL FRAME NUMBER | 6 BITS |
| PARTITION ID | 16 BITS |
| AREA ID | 4 BITS |
| DATA ID | 4 BITS |
| N-POSITION | 4 BITS |
| N-REPEAT | 4 BITS |
| GROUP COUNT | 24 BITS |
| FILE MARK COUNT | 32 BITS |
| SAVE SET MARK COUNT | 32 BITS |
| RECORD COUNT | 32 BITS |
| ABSOLUTE FRAME COUNT | 24 BITS |
| UNDEFINED | |

FIG.13

| BIT 3210 | DEFINITION |
| --- | --- |
| 0000(0) | DEVICE AREA |
| 0001(1) | REFERENCE AREA |
| 0010(2) | SYSTEM AREA |
| 0011(3) | UNDEFINED |
| 0100(4) | DATA AREA |
| 0101(5) | EOD AREA |
| 0110(6) | UNDEFINED |
| 0111(7) | OPTION DEVICE AREA |

FIG.14

VOLUME INFORMATION OF MIC

| EJECT STATUS | 20 BYTES |
|---|---|
| REEL DIAMETER | 4 BYTES |
| INITIALIZE COUNT | 3 BYTES |
| RAW FORMAT ID | 2 BYTES |
| DDS MODE | 1 BIT |
| ULPBOT | 1 BIT |
| SYSTEM LOG ALIVE | 2 BITS |
| LAST PARTITION NUMBER | 1 BYTE |
| DEVICE AREA MAP | [0...255] BITS |

FIG.28

APPEND PARTITION COMMAND

| Bit<br>Byte | 7 | 6 | 5 | 4 | 3 | 2 | 1 | 0 |
|---|---|---|---|---|---|---|---|---|
| 0 | UNDEFINED | | | | PAGE CODE (32h) | | | |
| 1 | PAGE LENGTH (8) | | | | | | | |
| 2 | UNDEFINED | | | | | | | |
| 3 | UNDEFINED | | | | | | | |
| 4 | UNDEFINED | | | PSUM (10) | | UNDEFINED | | |
| 5 | UNDEFINED | | | | | | | |
| 6 | UNDEFINED | | | | | PARTITION UNIT | | |
| 7 | UNDEFINED | | | | | | | |
| 8 | (MSB) | | | POSITION SIZE DESCRIPTOR | | | | |
| 9 | | | | | | | | (LSB) |

FIG.29

DELETE PARTITION COMMAND

| Bit<br>Byte | 7 | 6 | 5 | 4 | 3 | 2 | 1 | 0 |
|---|---|---|---|---|---|---|---|---|
| 0 | UNDEFINED | | | | | | | |
| 1 | PAGE CODE (33h) | | | | | | | |
| 2 | PAGE LENGTH (8) | | | | | | | |
| 3 | INDICATED PARTITION NUMBER | | | | | | | |
| 4 | UNDEFINED | | | | | | | |
| 5 | UNDEFINED | | | | | | | |
| 6 | UNDEFINED | | | | | | | |
| 7 | UNDEFINED | | | | | | | |
| 8 | UNDEFINED | | | | | | | |
| 9 | UNDEFINED | | | | | | | |

FIG. 30

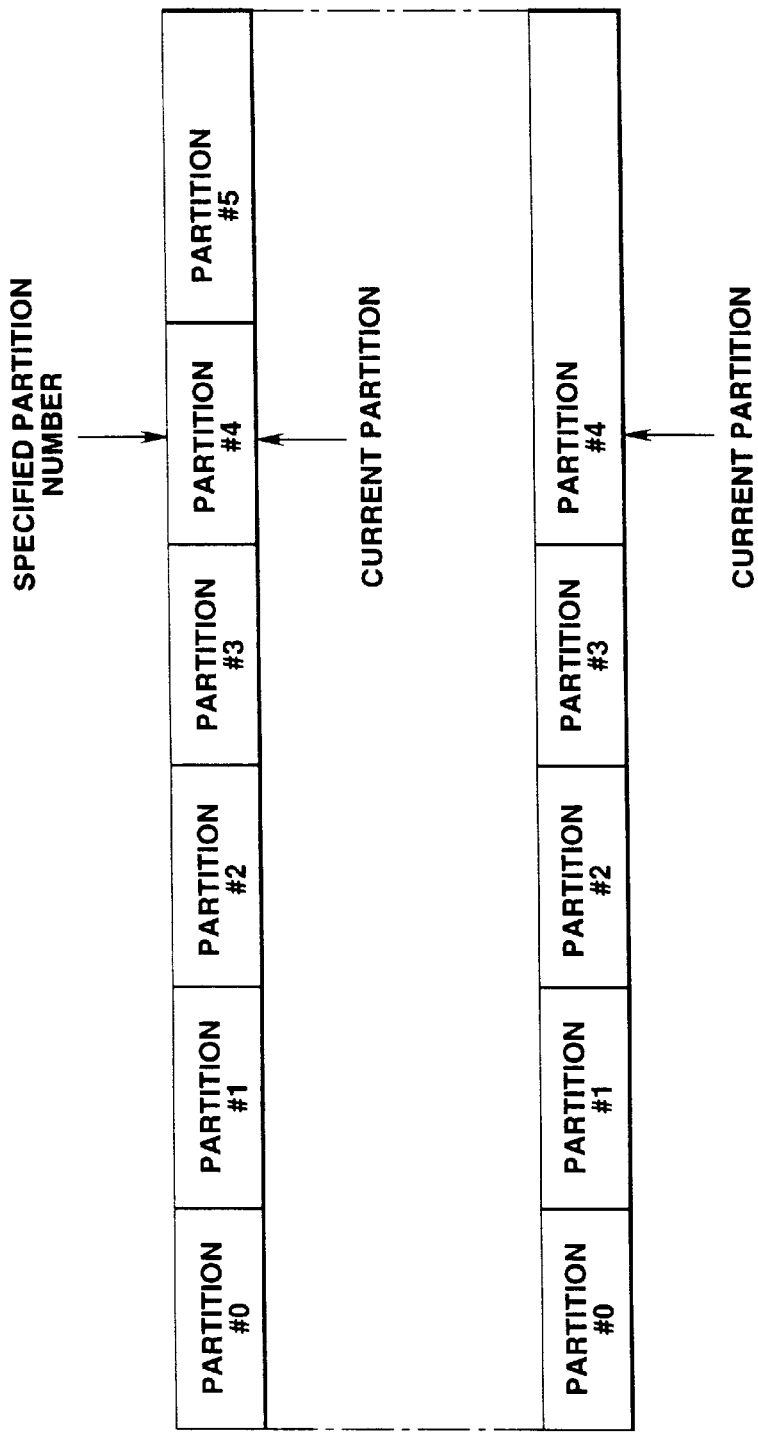

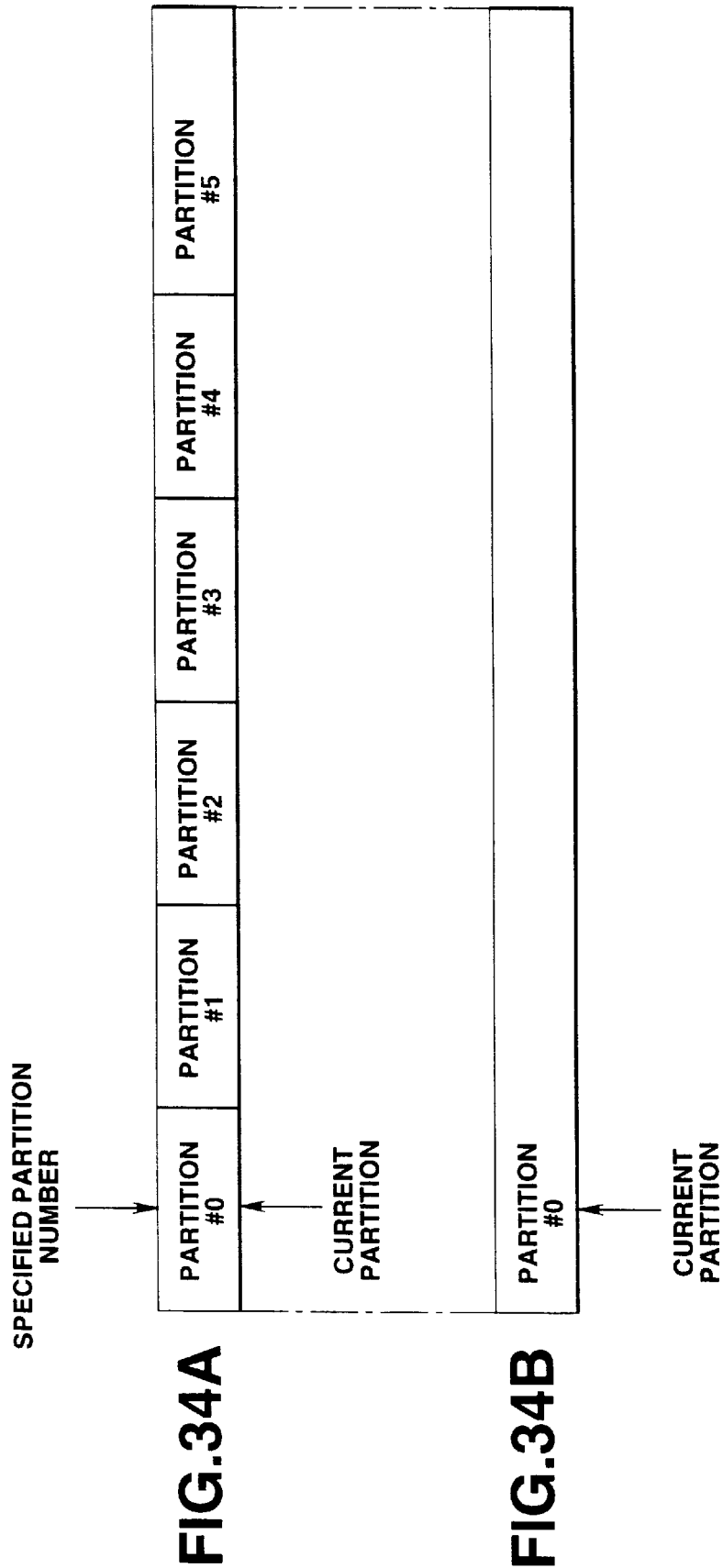

TAPE CASSETTE AND A TAPE RECORDING APPARATUS

TECHNICAL FIELD

The present invention relates to a tape cassette constructed by containing a tape-like recording medium in a cassette, and a tape recording apparatus for recording record data onto the tape-like recording medium.

BACKGROUND ART

Conventionally, a so-called tape streaming drive is known as a tape recording/reproducing apparatus capable of recording/reproducing digital data onto/from a magnetic tape. This kind of tape streaming drive can have a huge recording capacity of about several tens to several hundreds gigabyte, for example, depending on the tape length of the tape cassette. This drive is therefore widely used for backup of data recorded on a medium like a hard disk in a computer and the like. This drive is also said to be suitably used for storing image data of a large data size.

As a tape streaming drive as described above, for example, a proposal has been made for an apparatus which uses a tape cassette for 8 mm-VTR as a recording medium and adopts a helical scan system based on a rotary head to record/reproduce data.

In the tape streaming drive using a 8 mm VTR tape cassette as described above, for example, SCSI (Small Computer System Interface) is used for the input/output interface for recording/reproducing data.

When recording data, for example, data supplied from a host computer is inputted through the SCSI interface. This input data is transferred in units of data groups each having a predetermined fixed length. The inputted data is subjected to compression processing if necessary and is then buffered in a buffer memory. The data buffered in the buffer memory is supplied to the recording/reproducing system, in units of data each having a fixed length, and recording onto a magnetic tape of a tape cassette is carried out by a rotary head.

When reproducing data, data on a magnetic tape is read by a rotary head and is once buffered in a buffer memory. The data from the buffer memory is subjected to expansion processing if the data has been subjected to compression processing when recording, and the data is then transferred to a host computer.

Each data recording region on the magnetic tape forms a numbered partition, and data can be reproduced therefrom or written thereinto.

To make appropriate recording/reproducing operation on a magnetic tape in a tape cassette in a data storage system using a tape streaming drive and a tape cassette as described above, various position information items on the magnetic tape and information items related to use history of the magnetic tape are necessary as management information which the tape streaming drive uses for management of recording/reproducing operation. These information items include the number of the latest used partition.

Hence, it has been discussed to store the management information into a memory means such as a memory chip separated from the magnetic tape. This memory means is attached to a part of an outer surface of the tape cassette.

In the side of the tape streaming drive, necessary management information items are read by accessing the memory means before making operation of recording or reproducing data with respect to the magnetic tape. Subsequent recording/reproducing operation is carried out properly based on the management information items. After recording or reproducing operation is finished, the memory means is accessed again to overwrite the contents of the management information, in order to overwrite the contents of the management information which need to be updated in accordance with the recording or reproducing operation. The system thus becomes ready for next recording/reproducing operation. Thereafter, the tape cassette is unloaded or ejected by the tape streaming drive.

Meanwhile, in case where recording data is recorded on a data recording region having a plurality of partitions formed on a magnetic tape, as described above, numbers are designated to the partitions in the descending order from the beginning of the tape (BOT) toward the end of the tape (EOT) of the tape-like recording medium as shown in FIG. 26. If eight partitions are formed, the partition numbers thereof are $P_7$, $P_6$, $P_5$, $P_4$, $P_3$, $P_2$, $P_1$, and $P_0$ from the beginning of the tape-like recording medium. This is because the total number of the partitions can be estimated from the first partition number formed at the beginning of the tape-like recording medium.

However, if the last partition of the tape-like recording medium is deleted from the partition numbers thus designated in the descending order, i.e., if the last partition is merged with the partition immediately before the partition itself, the total number of the partitions formed on the tape-like recording medium cannot be estimated from the first partition number at the beginning of the tape-like recording medium.

Thus, this kind of data storage system is based on the prerequisite that partitions may not be deleted. Therefore, all the partitions except for the last partition need to be preformatted before recording the recording data. Since the preformatting must be performed substantially over the entire tape-like recording medium, the longer time is required as the data capacity of the tape-like recording medium increases. For example, if continuous transfer rate is 2 Mbyte/sec, 10,000 seconds or more or about three hours data capacity are required to pre-format a tape-like recording medium having a data capacity of 20 Gbyte.

DISCLOSURE OF THE INVENTION

The present invention has been made in view of the above-described situation and has an object of providing a tape cassette and a tape recording apparatus in which partitions can be freely added or deleted, the total number of partitions formed on the tape-like recording medium can be easily estimated, and pre-formatting is not required.

To solve the problems described above and to achieve the object, a tape cassette according to the present invention comprises: a tape-like recording medium having at least two numbered partitions in each of which recording data is recorded; and memory means for storing auxiliary information concerning each of the partitions, independently from the tape-like recording medium, wherein partition numbers respectively assigned to the partitions are assigned in an ascendant order from a beginning side of the tape-like recording medium toward an end side thereof, and wherein the memory means stores at least a maximum number among the partition numbers assigned to the partitions.

Also, a tape recording apparatus according to the present invention is an apparatus for recording recording data onto a tape-like recording medium of a tape cassette including the tape-like recording medium divided into at least two numbered partitions in each of which recording data is recorded, and memory means for storing auxiliary information concerning each of the partitions, independently from the tape-like recording medium. The tape recording apparatus comprises: input means for inputting recording data to be recorded on the tape-like recording medium; read means for reading the auxiliary information from the memory means; recording control means for recording the recording data inputted by the input means, onto the tape-like recording medium, based on the auxiliary information obtained by the read means; auxiliary information generation means for generating new auxiliary information issued when the recording data is recorded onto the tape-like recording medium; and write means for writing the new auxiliary information generated by the auxiliary information generation means, into the memory means, wherein the recording control means appends a new partition in such a manner in which a last partition is divided and a number obtained by increasing, by one, a maximum number among partition numbers assigned to the partitions before division is assigned to a partition after a dividing part where the last partition is divided.

Further, in the tape recording apparatus according to the present invention, the recording control means assigns partitions' partition numbers in an ascending order from a beginning side of the tape-like recording medium toward an end side thereof.

Further, in the tape recording apparatus according to the present invention, the write means stores a maximum number among partition numbers assigned to partitions, into the memory means.

Further, in the tape recording apparatus according to the present invention each of the partitions has a system area where use history information is recorded, a data area where the recording data is recorded, and a EOD area which indicates an end of the data area, and when appending a partition, the recording control means feeds the tape-like recording medium until an EOD area contained in a last partition is found, and forms a device area for loading/unloading the tape-like recording medium and a system area and a EOD area of the partition to be appended, sequentially after the found EOD area.

Further, in the tape recording apparatus according to the present invention, the read means reads the unload information of a last time, and the recording control means appends a new partition only when the device area of the loaded tape-like recording medium is equal to the unload position.

Further, in the tape recording apparatus according to the present invention, each of the partitions includes a system area where use history information is recorded, a data area where the recording data is recorded, and a EOD area which indicates an end of the data area, and when appending a partition, the recording control means feed the tape-like recording medium to a position of a EOD area contained in a partition at a present position, forms an extended data area corresponding to a size of a region specified by a command supplied from outside, and sequentially forms a device area for loading/unloading the EOD area and the tape-like recording medium, and a system area and a EOD area of the partition to be appended.

Further, in the tape recording apparatus according to the present invention, the recording control means forms a EOD area as the extended data area.

Further, in the tape recording apparatus according to the present invention, the write means updates the auxiliary information so as to store a maximum number among partition numbers assigned to the partitions of the tape-like recording medium including the appended partition.

Furthermore, another tape recording apparatus according to the present invention is an apparatus for recording data onto a tape-like recording medium of a tape cassette including the tape-like recording medium divided into at least two numbered partitions including a last partition extending to an end of the tape-like recording medium, in each of which recording data is recorded, and memory means for storing auxiliary information concerning each of the partitions, independently from the tape-like recording medium. The apparatus comprises: read means for reading the auxiliary information from the memory means; recording control means for erasing recording data recorded on the tape-like recording medium, based on the auxiliary information read by the read means; auxiliary information updating means for updating the auxiliary information when the recording data recorded on the tape-like recording medium is erased; and write means for writing new auxiliary information updated by the auxiliary information updating means, wherein, only when a partition specified by a delete command supplied from outside is a partition on or after a partition presently used and the specified partition is not the last partition, the recording control means deletes a partition or partitions after the specified partition and sets the specified partition as the last partition.

Further, in the tape recording apparatus according to the present invention, the auxiliary information includes number information indicating a maximum number among partition numbers assigned to partitions formed on the tape-like recording medium, and the auxiliary information updating means updates the number information in accordance with deletion of a partition.

Further, in the tape recording apparatus according to the present invention, the recording control means assigns the partition numbers in an ascending order from a beginning side of the tape-like recording medium toward an end side thereof.

BRIEF DESCRIPTION OF THE DRAWINGS

FIG. 13 is a table showing ID area information of the magnetic tape.

FIG. 14 is a table showing definitions of the area ID contained in the ID area information.

FIG. 28 is a table showing the contents of volume information of MIC.

FIG. 29 is a diagram showing the configuration of an append partition command.

FIG. 30 is a diagram showing the configuration of a delete partition command.

FIG. 33A is a schematic diagram showing a state before processing a case where the partition rendered active and the partition designated by an indicate partition number are both the partition just before the last partition.

FIG. 33B is a schematic diagram showing a state after processing a case where the partition rendered active and the partition designated by an indicate partition number are both the partition just before the last partition.

FIG. 34A is a schematic diagram showing a state before processing a case where the partition rendered active and the partition designated by an indicate partition number are both the first partition.

FIG. 34B is a schematic diagram showing a state after processing a case where the partition rendered active and the partition designated by an indicate partition number are both the first partition.

BEST MODE FOR CARRYING OUT THE INVENTION

In the following, embodiments of the present invention will now be explained with reference to the drawings.

The present applicant has proposed various inventions related to a tape cassette provided with a non-volatile memory and a tape streaming drive capable of recording/reproducing digital data in association with the tape cassette with a memory. In the present embodiments, the present invention is applied to a data storage system consisting of a tape cassette with the memory and the tape streaming drive. Note that the non-volatile memory comprised in the tape cassette is called a Memory In Cassette (hereinafter MIC).

At first, explanation will be made of a tape cassette applicable to the tape streaming drive, according to the present embodiment.

Figure 1:
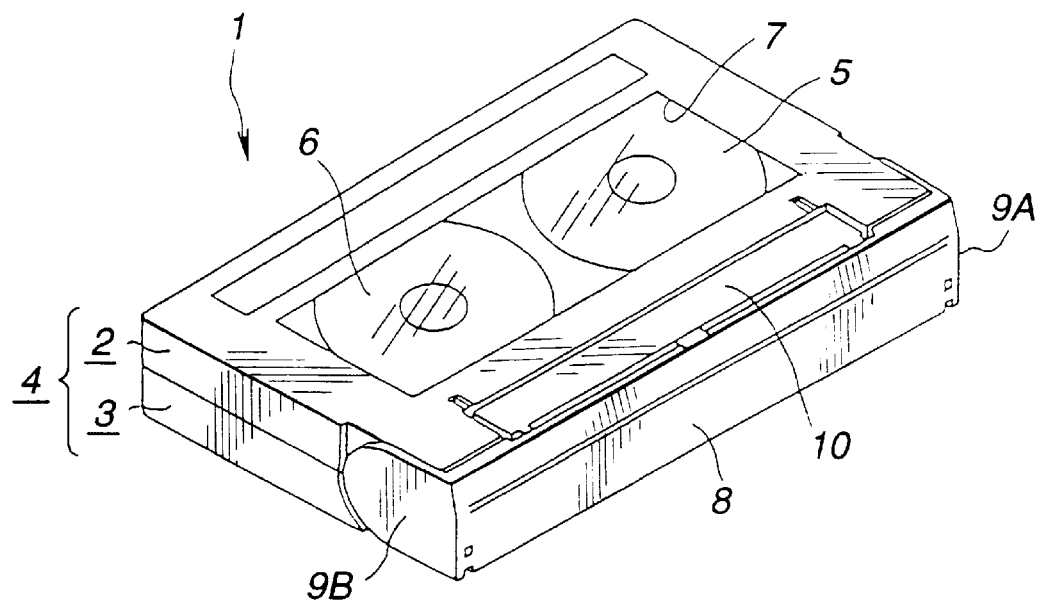
FIG. 1 is a perspective view showing the structure of a tape cassette according to the present invention, including the upper surface and the front surface thereof.

In a tape cassette 1, for example, as shown in FIG. 1, paired upper and lower halves 2 and 3 each made of a synthetic resin material in the form of shallow rectangular dishes are joined to each other with their open sides contacting each other and are thereafter combined with each other by a plurality of lock screws, to construct a substantially box-like cartridge body 4. A tape feed reel 5 and a tape wind reel 6 between which are rotatably contained in the cartridge body 4 and disposed in the lengthwise direction of the body, with a magnetic tape 12 as a tape-like recording medium bridged between the reels.

Figure 2:
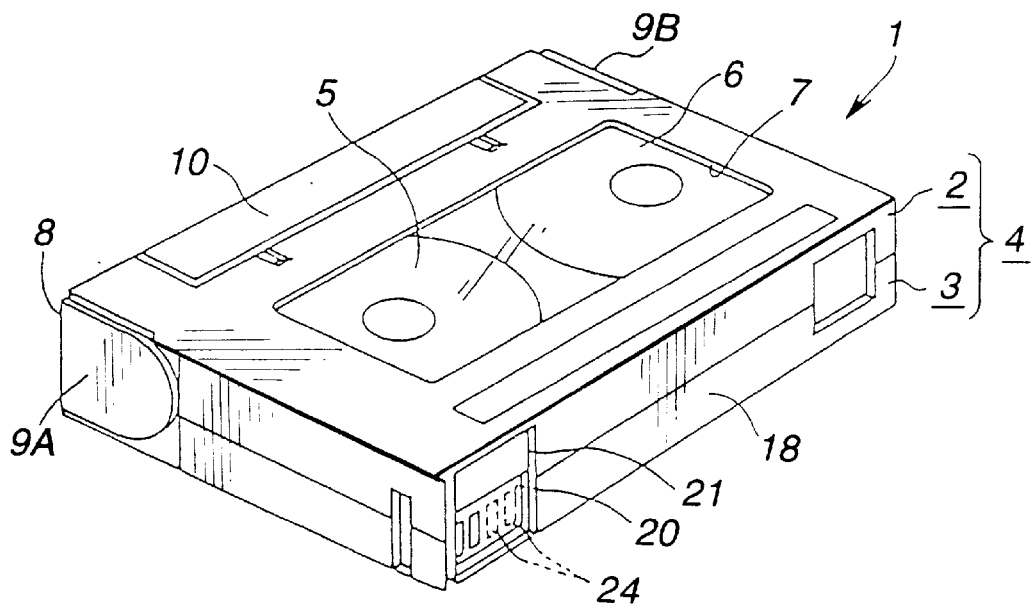
FIG. 2 is a perspective view showing the structure of the tape cassette, including the upper surface and back surface thereof.
Figure 3:
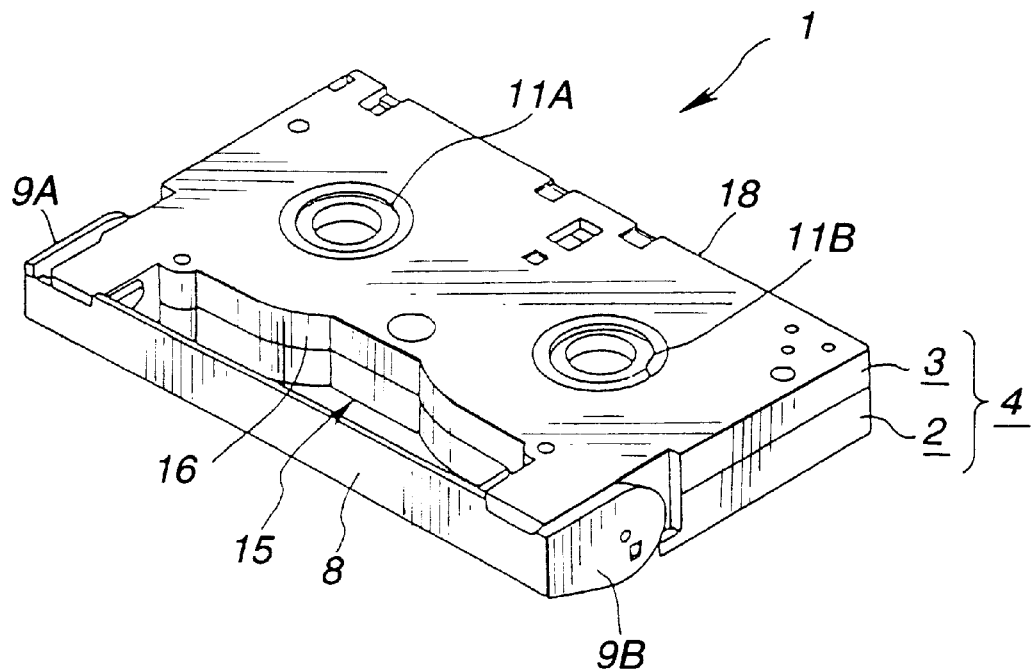
FIG. 3 is a perspective view showing the structure of the tape cassette, including the bottom surface and the front surface thereof.

In the cartridge body 4, as shown in FIG. 2, a rectangular view window 18 is provided on the top surface of the upper half 2 forming the upper surface part, and the condition of the magnetic tape wound around the feed tape feed reel 5 and the tape wind reel 6 contained inside the cartridge body 4 can be observed by eye from outside.

Also, in the cartridge body 4, the lower half 3 forming the bottom surface part is provided with hub engage holes 11a and 11b which make parts of hubs of the tape feed reel 5 and the tape wind reel 6 exposed to the outside and which restrict rotations of the reels 5 and 6. Note that various identification holes such as a tape length detection hole for detecting the length of the magnetic tape 12, a tape specification identification hole, and the like are formed in the bottom surface part of the lower half 3.

Each of the tape feed reel 5 and the tape wind reel 6 is comprised of a cylindrical hub portion around which the magnetic tape 12 is wound and a disk-like flange portion provided at an end side of the hub portion. These tape feed reel 5 and tape wind reel 6 are rotatably contained in the cartridge body 4 in a manner in which their hubs are respectively engaged in hub engage holes 11A and 11B. In addition, the tape feed reel 5 and the tape wind reel 6 are prevented from backlashing since the rotation center portion of each hub portion is energized toward the lower half 3 by a reel press spring and a reel press plate which are not shown.

Both ends of the magnetic tape 12 are fixed to the hub portions of the tape feed reel 5 and the tape wind reel 6 by clampers not shown. The tape fed from the tape feed reel 5 travels along the front surface portion 14 of the cartridge body 4, guided by tape guides 13A and 13B integrally formed on the lower half 3, and is wound up by the tape wind reel 6.

The front surface part 14 of the cartridge body 4 is opened throughout the substantially entire area in the widthwise direction, and a tape extraction part 15 as a space through which the loading means of the recording/reproducing part 130 side enters is provided to be continuous from the front surface part 14. In the cartridge body 4, the inner space where the tape feed reel 5 and the tape wind reel 6 are rotatably contained and the tape extraction part 15 are separated from each other by a partition wall 16.

A cover member 8 for closing the opened front surface part 14 is rotatably assembled in the cartridge body 4. The cover member 8 has a length substantially equal to the width of the cartridge body 4 and is formed in a substantial U-shape as a whole by integrally forming the side wall portions 9A and 9B. Pin shafts are integrally formed on the inner surfaces of the side wall portions 9A and 9B with their axes aligned with each other.

Meanwhile, in the cartridge body 4, both side walls of the lower half 3 are projected and extended so as to surround the opened front surface portion 14, thereby forming fulcrum portions 15A and 15B. Shaft holes are respectively formed at these fulcrum portions 15A and 15B, with their axes aligned with each other in correspondence with the pin shafts of the cover member 8. Accordingly, the cover member 8 can be rotatably connected to the front surface portion 14 of the cartridge body 4 by engaging respectively the pin shafts in the shaft holes. The cover member 8 normally closes the opened front surface portion 14 of the cartridge body 4.

Figure 4:
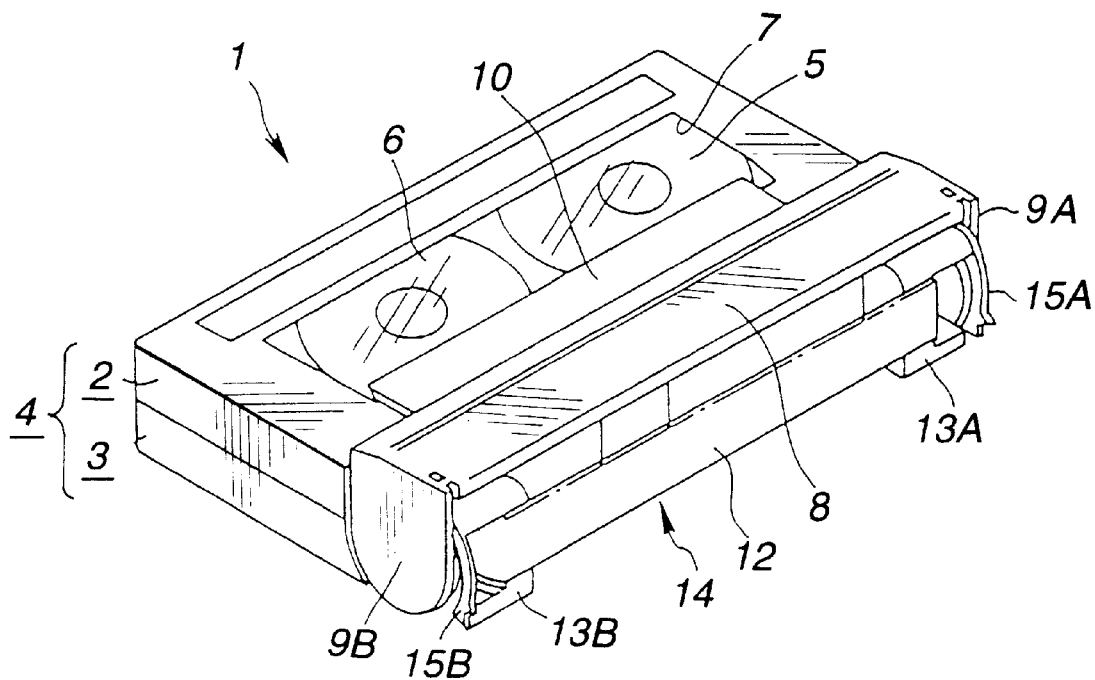
FIG. 4 is a perspective view showing a state where the lid of the tape cassette is opened.

The cover member 8 is equipped with an upper cover member 10 which closes the front opened part of the upper half 2 and with a spring member not shown. The upper cover member 10 is rotatably attached to the inner surface of the cover member 8. As shown in FIG. 4, in a state where the cover member 8 is rotated and opens the front surface part 14, the upper cover member 10 is rotated and moves along the upper surface part of the upper half space 2, supported by the cover member 8. In this case, the spring member stores an elastic force and energizes the cover member 8 so as to cause a rotation behavior in the direction in which the front surface part 14 of the cartridge body 4 is closed, although the details will be omitted herefrom.

Also, an inner cover member is rotatably attached to the cover member 8 such that the inner cover member is opposed to the inner main surface of the member 8, although the details will be omitted herefrom. This inner cover member is normally opposed and supported with a predetermined clearance maintained from the inner main surface of the cover member 8, and the magnetic tape 12 positioned at the front surface part 14 of the cartridge body 4 is provided in the clearance. Accordingly, the magnetic tape 12 is normally covered by the cover member 8 and the inner cover member, thus protected from sticking dust or external forces. The inner cover is rotated in association with the rotation of the cover member 8 described above, exposing the magnetic tape 12 to the front surface part 14.

Figure 15:
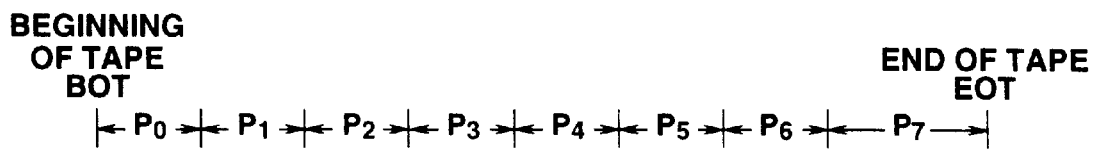
FIG. 15 is a schematic chart showing the order of numbers of partitions in a tape cassette according to the present invention.

As shown in FIG. 15, at least two numbered partitions are formed on the magnetic tape 12, and recording data is recorded onto each of these partitions. The numbers designated to the partitions are given in a descendent order from the beginning end side of the tape-like recording medium (BOT) to the end side thereof (EOT). That is, the number of the partition starting from the beginning end of the magnetic tape 12 is $P_0$, and partitions added with numbers of $P_1$, $P_2$, $P_3$, $P_4$, $P_5$, $P_6$, and $P_7$ are sequentially formed toward the end of the magnetic tape 12. The region of the partition added with the largest number reaches the end of the magnetic tape 12.

Also, an auxiliary memory device as a memory means is mounted on the tape cassette 12 is mounted on the tape cassette 1. This auxiliary memory device is comprised of at least a wiring board, a non-volatile memory MIC (Memory In Cassette), and a plurality of contact terminals 24 as input/output terminals of the MIC, formed on the wiring board.

The MIC is comprised of a memory element and an input/output control section which controls the input/output of data to/from a write/read control section 163 of the tape streaming drive connected to the MIC through the contact terminals and a connector described later.

For example, in the case where the number of contact points of the contact terminals 24 is set to a number smaller than the sum of the numbers of data lines, address lines, and power supply lines of the memory element, the input/output of data between the MIC and the write/read control section 163 is achieved by serial communication. In this case, communication control sections are respectively provided for the input/output control section and the write/read control section.

If the input/output of data between the MIC and the write/read control section 163 is thus achieved by serial communication, the number of contact terminals 24 can be reduced and the area of the contact terminals 24 can be reduced. Therefore, the size of the terminal opening portion 21 formed on the tape cassette 1 can be reduced so that the other components of the tape cassette 1 can be designed with ease.

Also, in the case where the number of contact points of the contact terminals 24 is set to a number smaller than the sum of the numbers of data line, address lines, and power supply lines of the memory element, the write/read control section 163 is capable of directly controlling writing/reading of data onto/from the memory device of the MIC. In this case, the input/output control section can be easily constructed and writing/reading to/from the memory device can be performed at a higher speed.

For example, identification information for identifying the contents of data recorded on the magnetic tape 12, the specifications of the magnetic tape, or the use condition thereof is recorded in the auxiliary memory device as described above.

The wiring board is constructed as a so-called double-sided board, and the MIC is equipped on the main surface side which is positioned inside when the board is assembled in the cartridge body 4 while the contact terminals 24 are printed and formed on the other main surface side which is positioned outside.

As shown in FIG. 2, the auxiliary memory device is arranged such that the contact terminals 24 faces outside through a terminal opening portion 21 which is positioned at a corner portion in the back surface side and is provided in the standing peripheral wall 18. This terminal opening portion 21 is formed as a rectangular opening portion having an opening size which is large enough to expose the contact terminals 24 of the auxiliary memory device to the outside. The auxiliary memory device is assembled in the cartridge body 4 such that the MIC is positioned inside and the contact terminals face outside through the terminal opening portion 21, with both side edges of the wiring board engaged in insertion grooves. A shutter member 20 is provided between the contact terminals 24 and the terminal opening portion 21. The shutter member 20 is formed as a rectangular member having an outer shape which sufficiently closes the terminal opening portion 21. The shutter member 20 is energized toward the bottom surface portion of the lower half 3 by elasticity of a tension spring not shown and normally closes the terminal opening portion 21.

Further, the auxiliary memory device stores at least the largest number among the numbers respectively designated to the partitions.

Figure 27:
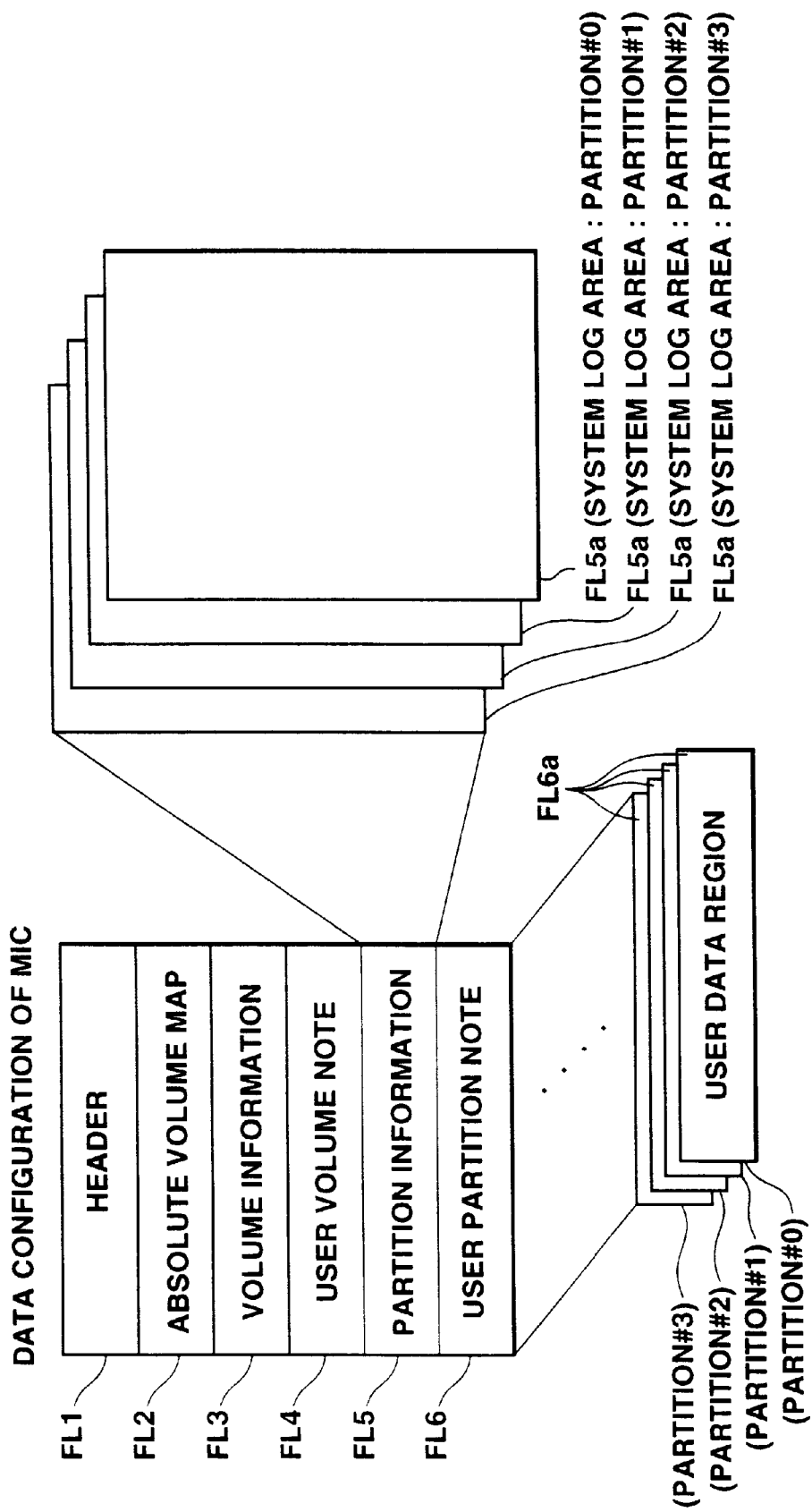
FIG. 27 is a schematic diagram showing the configuration of data stored in MIC.

The data configuration of the MIC will be explained with reference to FIG. 27. The capacity of this MIC is set to 2 MB (Megabyte), and fields FL1 to FL6 are set in this region, as shown in FIG. 27. In these fields FL1 to FL6, the field FL1 is used as a MIC header. Written into this field is various information at the time the tape cassette was manufactured, tape information at the time of initialization, and information concerning respective partitions.

The field FL2 is used as an absolute volume map, and for example, absolute position information concerning data recorded with respect to the volume of the one magnetic tape is stored in this field.

The field FL3 is used for volume information, and various use history information concerning the volume of the magnetic tape is stored in this field. The information stored in these regions is used for recording/reproducing control in the tape streaming drive.

An example of contents of data described as the volume information is shown in FIG. 28. As shown in FIG. 28, Eject Status of 20 byte, Reel Diameter of 4 byte, Initialize Count of 3 byte, Raw Format ID of 2 byte, DDS Mode of 1 bit, ULPBOTA of 1 bit, Sys Log Alive of 2 bit, Last Partition Number of 1 byte, and Device Area Map are described.

Among them, information as the position at which the tape cassette is unloaded (e.g., position information as a reel diameter) is described as the eject status and the reel diameter.

The DDS mode is a bit indicating a normal mode or a multi-partition mode. DDS mode="0" indicates the normal mode while DDS mode="1" indicates the multi-partition mode.

The ULPBOT indicates the permission status concerning loading/unloading. ULPBOT="0" indicates that loading/unloading is permitted in the device area and the optional device area, i.e., loading/unloading in units of partitions is permitted. Meanwhile, ULPBOT="1" indicates that loading/unloading must be performed only in the device area at the tape top.

The Sys Log Alive indicates the status in which recording of system log information is performed on the tape and the MIC. Specifically, Sys Log Alive="0" indicates that the system log information exists on the magnetic tape, while Sys Log Alive="11" indicates that the system log information exists on both the magnetic tape and the MIC.

The Last Partition Number indicates the number of the last partition formed.

The device area map indicates position information of the device area (and the optional device area).

The field FL4 subsequent to the field FL3 as the volume information as described above is used for Use Volume Note and stores information concerning the tape cassette itself, supplied by the user (or vendor). If necessity, this information is supplied to an external host computer and is utilized for necessary processing control.

The field FL5 is used for partition information and stores various information concerning use history of the magnetic tape for every partition written in the magnetic tape. The information is utilized as information which the tape streaming drive uses to manage recording/reproducing operation of itself. This partition information is formed by the region of the Sys Log Area FL5a.

Since the system log area FL5a is created so as to correspond to each of the partitions actually recorded on the magnetic tape, the number of tables in the system log area FL5a corresponds to the number of partitions created on the magnetic tape.

The system log area FL5a is created so as to correspond to each of the partitions recorded on the magnetic tape 3. Therefore, the system log area FL5a stores information concerning the partitions if a plurality of partitions are recorded on the magnetic tape. If only one partition exists, the information of the system log area FL5 relates to the whole magnetic tape.

The field FL6 subsequent to the field FL5 is used for User Partition Notes and stores various information such as comments which can be written for every partition by a user. The user partition notes of this field FL6 are formed by a user data area FL6a (User Data for Every Partition) which is created so as to correspond to every of the partitions recorded on the magnetic tape.

Meanwhile, on the magnetic tape, a system area is provided at the top of every partition. In some cases, a system area provided on the magnetic tape records the same information contents as the data contents of the MIC. For example, the volume information of the field FL3 and the same information contents as that of the system log area are recorded therein. Specifically, in the data storage system according to the present embodiment, an area capable of storing system information is provided in each of the MIC and the magnetic tape.

Figure 5:
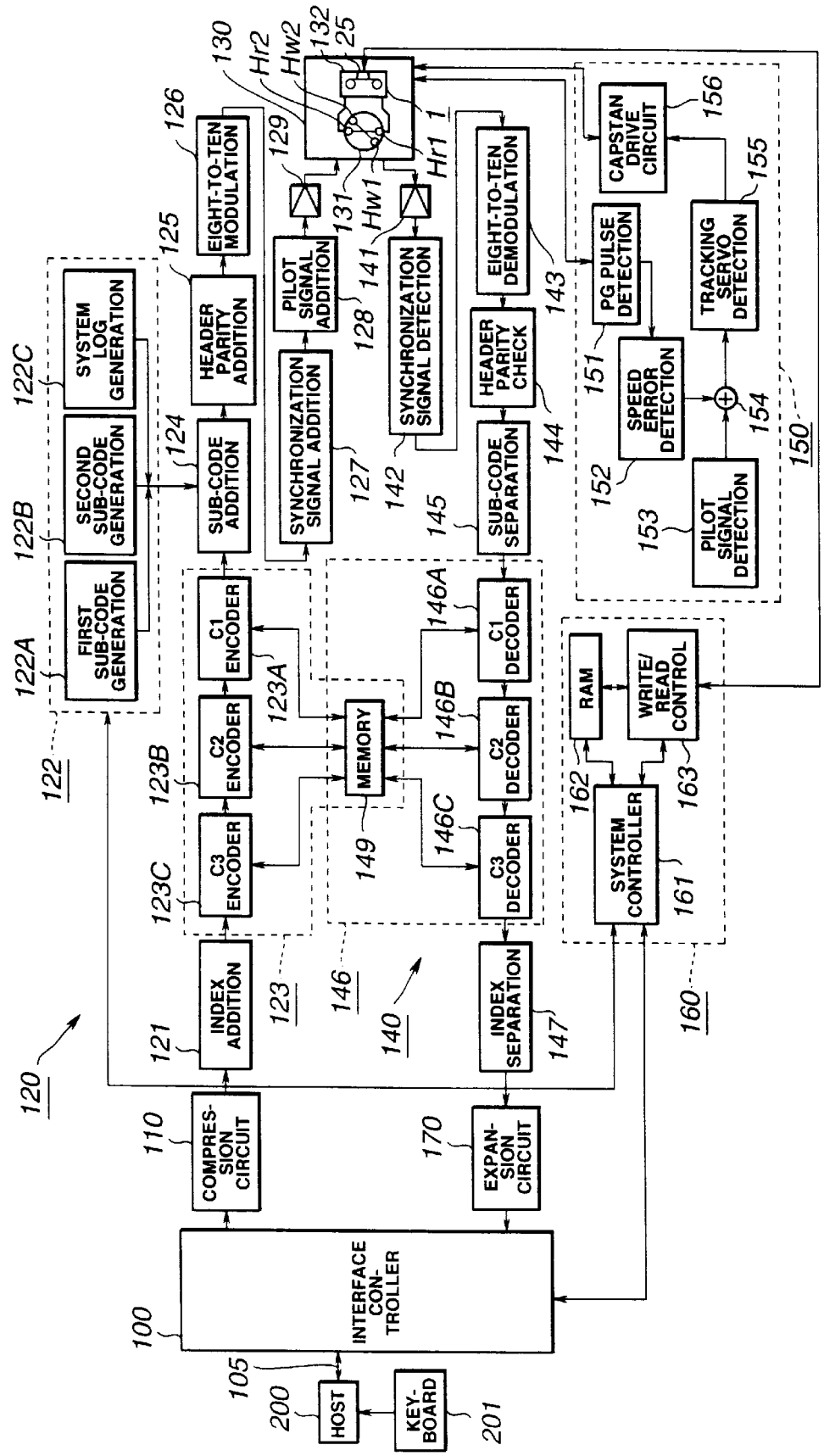
FIG. 5 is a block diagram showing the configuration of the tape streaming apparatus according to an embodiment of the present invention.

Next, FIG. 5 is a block diagram showing an example of a tape streaming apparatus as an embodiment of the data recording apparatus according to the present invention.

The tape streaming apparatus shown in FIG. 5 comprises an interface controller 100 for transmitting/receiving data to/from outside, a recording data processing system 120 for converting data inputted through the interface controller 100 into a predetermined format by subjecting the data to signal processing, and a recording/reproducing section 130 for recording a signal supplied from the recording data processing system 120 onto a magnetic tape and for reproducing data from the magnetic tape. This tape streaming drive comprises a reproducing data processing system 140 for performing signal processing on a reproduced output from the recording/reproducing section 130 thereby to reproduce data recorded on the magnetic tape, a tracking control system 150 for controlling a tape travelling system of the recording/reproducing section 130, and a recording data managing section 160 for managing data to be recorded on the magnetic tape.

Also, the tape cassette 1 used for the tape streaming drive internally comprises a MIC (Memory In Cassette) 11 as an auxiliary memory device for storing identification information and system logs which are used for identifying data recorded on the magnetic tape, as described before.

In this tape streaming drive, the interface controller 100 is of a so-called SCSI (Small Computer System Interface), and supplies the recording data processing system 120 with data provided from external information processing devices such as personal computers and work stations, as well as those information processing devices with recording data reproduced by the reproducing data processing system 140.

In this tape streaming drive, data is sequentially inputted in data transfer units of records each having a fixed length through the SCSI interface 100 from a host computer 200 and is supplied to a compression circuit 110, for example, when recording data. Although this kind of tape streaming drive system has a mode in which data is transferred in set units of data each having a variable length from the host computer 200, explanation thereof will be omitted herefrom. Note that this host computer 200 is connected with a keyboard 201 and the like.

In the compression circuit 110, inputted data is subjected to compression processing in accordance with a predetermined system if necessary. If a compression system based on LZ codes is used as an example of the compression method, a character string previously processed is applied with a specialized code and is stored in the form of a dictionary. Further, a character string newly inputted is compared with the contents of the dictionary. If a character string of inputted data corresponds to a code in the dictionary, the character string data is replaced with the code in the dictionary. Data pieces of inputted character strings which do not correspond to any code in the dictionary are applied with new codes and are registered into the dictionary, one after another. In this manner, data compression is achieved by registering data of inputted character strings into the dictionary and by replacing character string data with codes of the dictionary.

The recording data processing system 120 comprises an index adder section 121 for adding index information to recording data supplied through the interface controller 100, a sub-code generator section 122 for generating a sub-code, an error correction signal generator section 123 by which recording data from the index adder section 121 is encoded into an error correction code, and a sub-code adder section 124 by which a sub-code from the sub-code generator section 122 and a block address are added to recording data encoded into an error correction code.

The sub-code generator section 122 is comprised of first and second sub-code generator sections 122A and 122B, and a system log generator section 122C. The error correction code generator section 123 is comprised of a memory 149, a C1 encoder 123A, C2 encoder 123B, and C3 encoder 123C.

This recording data processing system 120 comprises a header parity adder means 125 for adding a header parity to recording data from the sub-code adder section 124, an 8/10 modulation section 126 for performing 8/10 modulation (eight-to-ten modulation) on recording data supplied from the header parity adder section 125, a synchronization signal adder section 127 for adding a synchronization signal to recording data supplied from the 8/10 modulation section 126, a pilot signal adder section 128 for adding a ATF (Automatic Track Following) pilot signal for tracking control to recording data supplied from the synchronization signal adder section 127, and an amplifier 129 for amplifying recording data supplied from the pilot signal adder section 128.

Also, the recording/reproducing section 130 comprises a rotation drum 131 for rotating two recording magnetic heads Hw1 and Hw2 having azimuth angles different from each other and two reproducing heads Hr1 and Hr2 also having azimuth angles different from each other, with these heads inclined with respect to the magnetic tape 12. These pairs of magnetic heads Hw1, Hw2, Hr1, and Hr2 are installed close to each other in the circumferential direction of the rotation drum 131 at an interval of a track pitch Tp in the axial direction of the rotation drum 131 (e.g., in the track width direction).

The reproducing data system 140 comprises an amplifier 141 for amplifying the reproduced output from the inclined track of the magnetic tape 12, a synchronization signal detection section 142 for detecting a synchronization signal from the reproduced output supplied from the amplifier 141, for binarizing the reproduced output, for correcting thereafter the time axis, and for outputting the reproduced output, a 8/10 demodulation section 143 for performing 8/10 demodulation (eight-to-ten demodulation) on binarized reproduced data from the synchronization signal detector section 142, and a header parity check section 144 for checking the header parity of reproduced data from the 8/10 demodulation section.

The system 140 also comprises a sub-code separation section 145 for separating a sub-code from reproduced data from the header parity check section 144, an error correction processing section 146 for performing error correction processing on the reproduced data from which the sub-code has been separated, supplied from the sub-code separation section 145, and an index separation section 147 for separating an index from the reproduced data which has been subjected to error correction processing by the error correction processing section 146. The error correction processing section 146 is comprised of a memory 149, C1 decoder 146A, C2 decoder 146B, and C3 decoder 146C.

The tracking control system 150 comprises a PG detection section 151 supplied with a PG pulse corresponding to the rotation of the rotation drum 131 from the recording/reproducing section 130, a speed error detection section 152 for detecting a speed error from the detection output from the PG detection section 151, a pilot signal detection section 153 for detecting a pilot signal for ATF from the reproduced output from the recording/reproducing section 131, an adder section 154 for adding together the detection outputs from the speed error detection section 152 and the pilot signal detection section 153, a tracking servo circuit 155 for generating a tracking servo signal based on the additional output from the adder section 154, and a capstan drive circuit 156 for controlling the tape travelling system of the recording/reproducing section 130 based on the tracking servo signal.

The recording data managing section 160 comprises a system controller 161 for performing processing such as management of data to be recorded on the magnetic tape, a RAM 162 for storing identification information, and a write/read control section 163 for controlling writing and reading with respect to the RAM 162 through the recording/reproducing section 130.

The system controller 161 writes, into the RAM 162, system logs and the like as identification information for managing partitions formed on the magnetic tape and files recorded on the magnetic tape. Further, the write/read control section 163 reads system logs stored in the RAM 162, supplies them to the MIC 25 through the recording/reproducing section, and writes the system logs to read from the MIC 25 into the RAM 162.

The expansion circuit 170 performs data expansion processing based on a determination made by the system controller 161 if data has been subjected to compression by the compressor circuit 110 when recording. If the data is not compressed, the circuit 170 allows the data to pass through without performing data expansion processing.

The output data from the expansion circuit 170 is outputted as reproduced data to the host computer 200 through the SCSI interface 100.

FIG. 5 also shows the MIC 25 provided in the tape cassette 1. When the tape cassette itself is loaded into the tape streaming drive, the MIC 25 is connected such that data can be inputted/outputted to/from the system controller 161 through terminal pins.

Information is transferred between the MIC 25 and the external host computer 200 with use of SCSI commands. Therefore, it is not particularly necessary to provide a specialized line between the MIC 25 and the host computer 200. As a result, data transfer between the tape cassette and the host computer 200 is completed only by the SCSI interface controller 100.

Next, explanation will be made of operation of the tape streaming apparatus having a configuration as described above.

In this tape streaming apparatus, recording data is supplied from an information processing device such as a personal computer, work station, or the like through the interface controller 100 when recording is carried out. When recording data is supplied through a bus 105, the interface controller 100 supplies the recording data to an index adder section 121 and a sub-code generator section 122.

When recording data is supplied form the interface controller 100, the index addition section 121 adds, to the recording data, index information for identifying a series of recording data, for every unit consisting of 40 tracks which are equivalent to 20 frames. The section 121 then supplies the data to an error correction code generator section 123.

The error correction code generator section 123 temporarily stores the supplied recording data for every unit. Further, the C3 encoder 123C generates an error correction code C3 for a data string corresponding to the track width direction, for every unit of recording data, and assigns the code to the last two tracks of the 40 tracks of one unit. The C2 encoder 123B generates an error correction code C2 for the above-mentioned data string corresponding to the track direction, and divides the code C2 into two pieces which are respectively assigned to both end portions of the data region of each track. Further, the C1 encoder 123A generates an error correction code C1 for every block described above.

Meanwhile, the first sub-code generator section 122A of the sub-code generator section 122 generates a separator count as pause information indicating a pause of recording data, a record count indicating the number of recording, and the like, based on the recording data inputted through the interface controller 100. In addition, the second sub-code generator section 122B generates an area ID indicating each region defined on the tape format, a frame number, a group count indicating the number of recording units, a check thumb, and the like, together with a block address. Further, the system log generator section 122C generates a system log (or history information) for every partition defined as the tape format.

The sub-code addition section 124 adds a sub-code supplied from the sub-code generator section 122 and a block address, to the recording data added with error correction codes C3, C2, and C1 by the error correction code generator section 123. In this manner, the sub-code and block address are assigned to the sub-code region (which is a second sector) of each of the blocks described above. In addition, the sub-code addition section 124 creates sub-data from the count value generated by the first sub-code generator section 122A, the area ID generated by the second sub-code generator section 122B, the group count, the check thumb and the like, and assigns the sub-data to the sub-code region of each block (which is the second sector).

The header parity addition section 125 generates a 2-byte parity for error detection with respect to the sub-code and block address added to recording data, by means of the sub-code addition section 124, and adds the 2-byte parity to the recording data. In this manner, the 2-byte parity is assigned to the third sector of each block.

By the 8/10 modulation section 126, recording data in the main data region added with the block address and the header parity by the header parity addition section 125 and recording data in each block of two sub-regions are converted into 10-bit format from eight-bit format for every unit of 1 byte so that the direct current level of the signal to be recorded is maintained.

The synchronization signal addition section 127 adds a synchronization signal to the recording data converted into 10-bit data by the 8/10 modulation section 126, for every block. In this manner, the synchronization signal is assigned to the first sector of each of the blocks described above. Further, the recording data thus formed is supplied to the pilot signal addition section 128.

The pilot signal addition section 128 generates and adds a pilot signal for ATF to the recording data, and supplies the data to the magnetic heads Hw1 and Hw2. In this manner, the magnetic heads Hw1 and Hw2 record the data, scanning the magnetic tape, and recording tracks are formed in a predetermined format on the magnetic tape.

Prior to the recording as described above, partitions may be previously formed on the magnetic tape 12. In this case, the system controller 161 creates partitions on the magnetic tape, thereafter creates management information of the partitions which indicate the number of the partitions and the beginning positions thereof, and writes the information into the RAM 162.

The system controller 161 reads identification information of respective files from the RAM 162, amends the information in accordance with recording or the like, and writes the information into the RAM 162, in the case where a directory is created, deleted, or changed in a partition or where a file is recorded, deleted, or changed in a directory. Further, the system controller 161 reads management information for managing the recording positions of respective files, amends the information in accordance with new positions of files, and writes the information into the RAM 162, in the case where a file is recorded, deleted, or amended.

Further, the write/read control section 163 writes updated management information of respective partitions into the MIC 25 through the connector 137 of the recording/reproducing section 130, when management information of respective partitions, identification information of respective files, and management information for managing recording positions of respective files, stored in the RAM 126 are updated.

In this manner, data is recorded onto the magnetic tape 12 in units of files, and identification information and the like of respective files recorded on the magnetic tape 12 are recorded in the MIC 25.

Also, in the case where data is recorded on a plurality of tape cassettes 1, the system controller 161 generates information concerning all the tape cassettes 1 which records the data, identification information for identifying respective tape cassettes 1 which records the data, and identification information for identifying data recorded on each tape cassette 1. The write/read control section 163 stores these identification information items into the RAM 162.

When the magnetic tape as described above is played in the tape streaming drive, the tape cassette 1 is loaded into the recording/reproducing section 130 and the contact terminals 24 are then exposed through the terminal opening portion 21. The contact terminals 24 thus exposed are connected to the write/read control section 163 through the connector 137.

The write/read control section 163 reads the above-mentioned management information, identification information of respective files, and management information for managing the recording positions of respective files, from the MIC 25 through the contact terminals 24, and writes them into the RAM 162.

Meanwhile, when reproduction of data of the magnetic tape 12 is instructed from the system controller 161, rotation of the rotation drum 131 is controlled such that the rotation speed of the rotation drum 131 becomes equal to that of recording, and traveling of the magnetic tape 12 is controlled such that the magnetic tape 12 travels at a constant speed. In this manner, the recording heads Hr1 and Hr2 for reproduction obliquely scan the magnetic tape, and the magnetic heads Hr1 and Hr2 supplies the synchronization signal detector section 142 with a reproduced output in accordance with scanning on recording tracks, through an amplifier 41. The synchronization signal detector section 142 detects a synchronization signal from the reproduced output, and binarizes the reproduced output depending on the clock synchronized with the synchronization signal. This section 142 thus generates reproduced data, and supplies the data to the 8/10 demodulation section 143.

The 8/10 demodulation section 143 converts the reproduced data of 10-bit format from the synchronization signal detector section 142 into 8-bit format data, and supplies this data to the header parity check section 144. The header parity check section 144 performs a parity check of the sub-code and block address by using the header parity of 2 bytes described above. Further, the sub-code separation section 145 separates a correct sub-code subjected to the parity check by the header parity check section 144, and supplies the memory 149 with reproduced data from which the sub-code has been separated, by the system controller 161.

The memory 149 temporarily stores the reproduced data added with index information for every unit each consisting of reproduced data of 40 tracks equivalent to 20 frames. Further, the C1 decoder 146A performs error correction processing on the reproduced data of each block with use of the error correction code C1 added to each block, based on the reproduced data of every unit stored in the memory 149.

In addition, the C2 decoder 146B performs error correction processing on the data string corresponding to the track direction, with respect to the reproduced data of every unit which has been subjected to the error correction processing by the C1 decoder 146A, with use of the error correction code C2 added to both end portions of the reproduced data region of each track. Further, the C3 decoder 146C performs error correction processing on the data string corresponding to the track width direction, with respect to the reproduced data of every unit which has been subjected to error correction processing by the C2 decoder 146B, with use of the error correction code C3 assigned to the last two tracks of the 40 tracks of each unit as described above.

In this tape streaming drive, since error correction processing has been performed on reproduced data with use of the error correction codes C1, C2, and C3, errors of the reproduced data can be securely corrected so that the reliability of the reproduced data can be improved.

Also, the index separation section 147 separates index information from the reproduced data of each unit which has been subjected to error correction processing by the error correction processing section 146 as described above, and supplies the index information to the system controller 161 as well as the reproduced data from which separated the index information to the interface controller 100.

Further, the interface controller 100 transmits the reproduced data from the index separation section 147 to the host computer 200 such as a personal computer, a work station, or the like, through the bus 105.

Figures 6A, 6B:
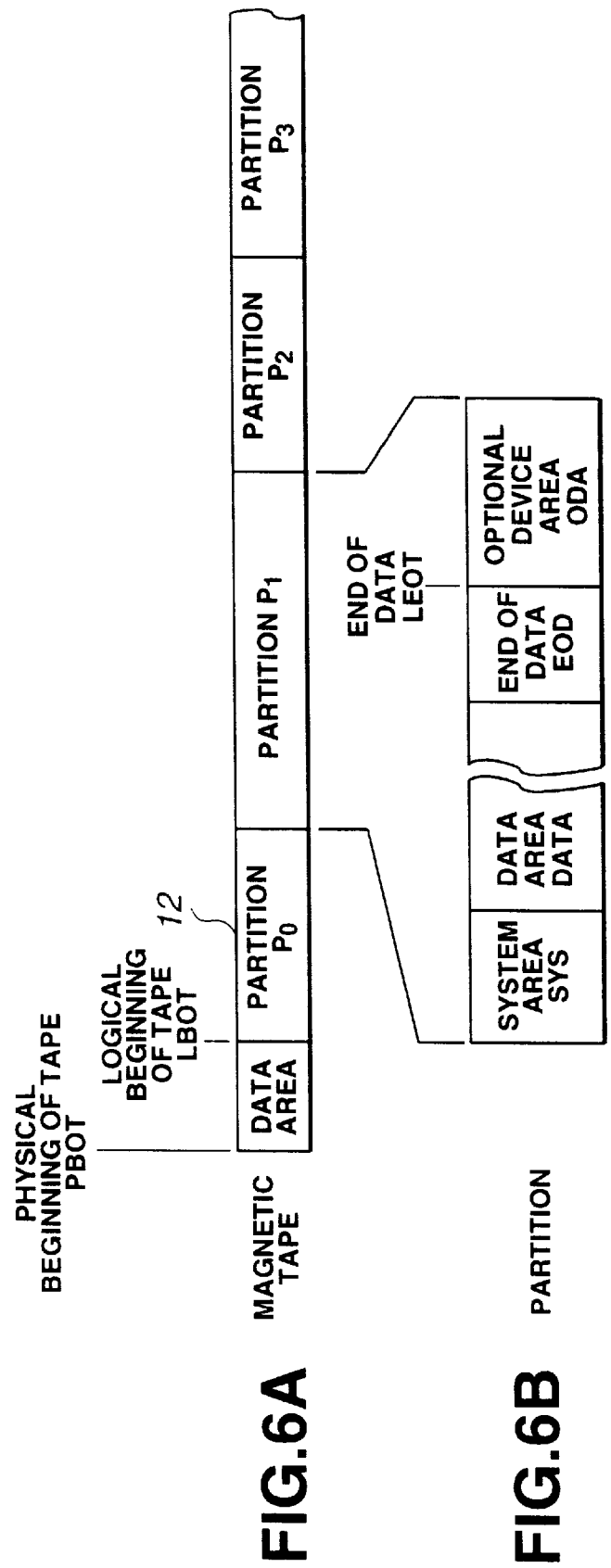
FIG. 6A shows the data configuration of a magnetic tape onto/from which data is written/read by the tape streaming apparatus.
FIG. 6B shows the schematic data configuration of a partition of the magnetic tape.

Next, FIGS. 6A and 6B shows the configuration of data recorded on the magnetic tape 12. FIG. 6A schematically shows a magnetic tape 12. In the present embodiment, it is possible to use one magnetic tape 3 divided in units of partitions, and the first partition $P_0$ is provided next to the device area to form the top of the tape. Subsequent to the first partition, partitions $P_1$, $P_2$, $P_3$, . . . are disposed in this order, in correspondence with the number of partitions thus divided. In the case of the system according to the present embodiment, it is possible to set and manage 256 partitions at most. The number assigned to each of the partitions $P_0$, $P_1$, $P_2$, $P_3$, . . . , i.e., n of the partition $P_n$ indicates the partition number. In the present embodiment, recording/reproducing of data can be independently performed for each of the partitions.

As shown in FIG. 6B, the schematic configuration of one partition $P_n$ (n=0, 1, 2, . . . ) consists of a system area SYS (which will be hereinafter referred to as SYS), data area DATA (which will be hereinafter referred to as DATA), end of data DOD (which will be hereinafter referred to as DOD), and optional device area ODA (which will be hereinafter referred to as ODA).

The detailed configuration of recorded data on the magnetic tape will now be explained with reference to FIG. 7.

Figure 7:
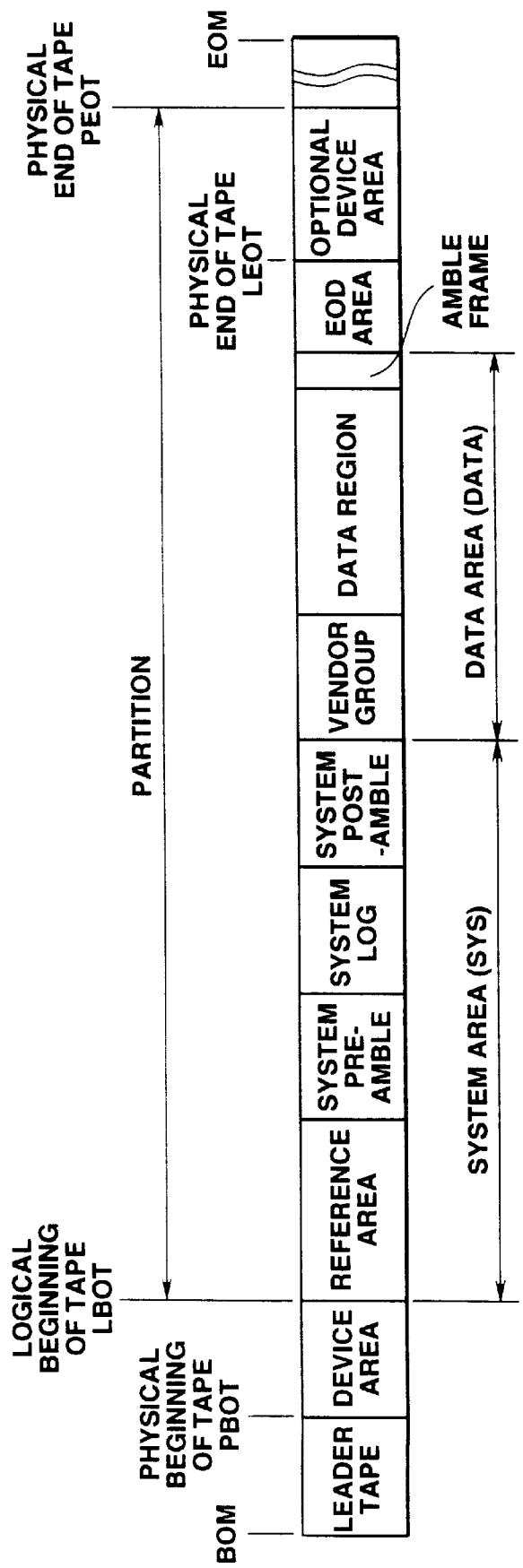
FIG. 7 shows the data configuration of a partition among a plurality of partitions formed on the magnetic tape.

A device area where the tape cassette is loaded/unloaded is provided between the physical beginning of tape PBOT of the tape shown in FIG. 7 and the logical beginning of tape LBOT thereof. Subsequent to the device area, a system area where the use history information or the like of the tape is stored is provided, and a data area is provided after the system area. The top of the system area is defined as the logical beginning of tape LBOT.

In this data area, a vendor group indicating information concerning the vendor which prepares and supplies data is first provided, and a data region and an amble frame is provided subsequently.

Subsequent to the data area, a region of end of data EOD indicating the end of the data region of the corresponding partition is provided. Further, the end of the EOD region is defined as the logical end of tape LEOT. The physical end of tape PEOT indicates the physical end position of the tape or the physical end position of a partition.

An option device area ODA is provided between the logical end of tap LEOT and the physical end of tape PEOT where it is defined as the end of a partition.

Figure 8A:
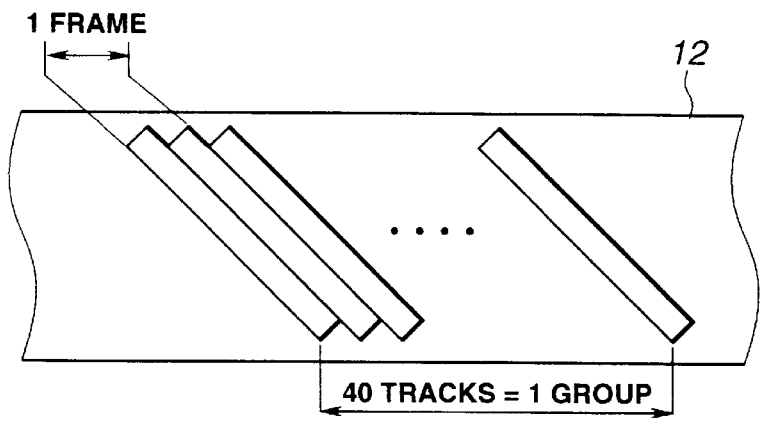
FIG. 8A is a diagram showing the configuration of a group consisting of a plurality of tracks on the magnetic tape.

Meanwhile, for example, oblique recording tracks are sequentially recorded and formed on the tape 12 by the rotation head, as shown in FIG. 8A, and one partition is formed of a plurality of groups each consisting of 40 tracks. That is, one recording unit of data in one partition is the group, and one group is formed of 20 frames (=40 tracks), as shown in FIG. 8A.

Figure 8B:
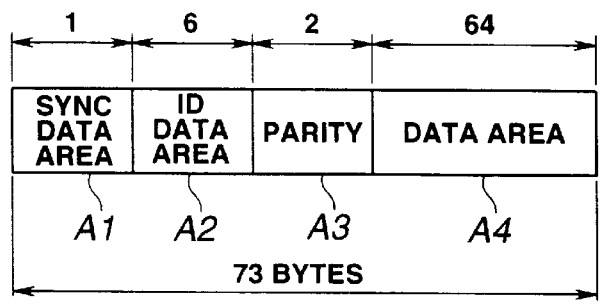
FIG. 8B is a diagram showing the data configuration of blocks forming one track on the magnetic tape.
Figure 8C:
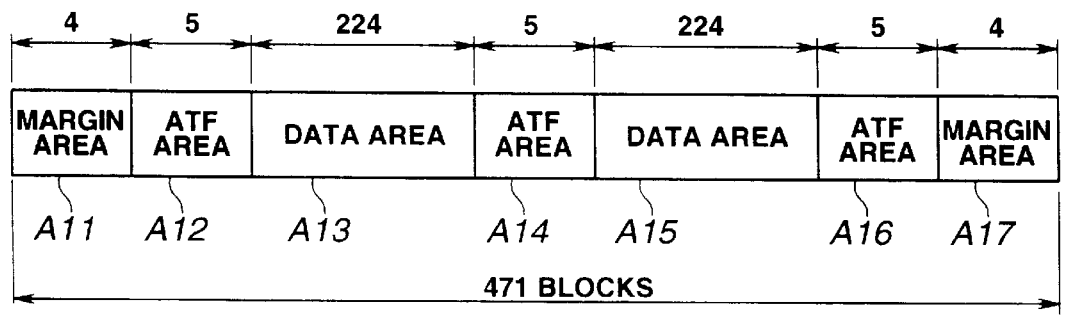
FIG. 8C is a diagram showing the data configuration of a track on the magnetic tape.

One track is divided into blocks each having the data configuration as shown in FIG. 8B. One track is formed of 471 blocks. That is, FIG. 8B shows the data configuration of one block, and one block consists of a SYNC data area A1 of 1 byte, a ID area A2 of 6 bytes used for searching or the like and subsequent to A1, a parity area A3 of 2 bytes for error correction for ID data, and a data area A4 of 64 bytes. In addition, one track is thus formed of total 471 blocks, as shown in FIG. 8C, and margin areas A11 and A17 equivalent to four blocks are provided at both ends of one track. ATF areas A12 and A16 are respectively provided after the margin area A11 and before the margin area A17. Further, an ATF area A14 is provided in the middle of one track. A region equivalent to five blocks is provided for each of the ATF areas A12, A14, and A16. Further, data areas A13 and A15 each equivalent to 224 blocks are respectively provided between the ATF areas A12 and A14 and between the ATF areas A14 and A16. Therefore, the whole data areas (A13 and A15) in one frame occupies 224×2=448 blocks among the total 471 blocks.

Also, in this tape streaming drive apparatus, the data region is divided into 448 blocks each consisting of 73 bytes, and further, each block is divided into a first sector of 1 byte for recording a synchronization signal, a second sector of 6 bytes for recording ID, a third sector of 2 bytes for recording a header parity, and a fourth sector of 64 bytes for recording data. Data is recorded together with a sub-code and a block address for every block.

Figure 9:
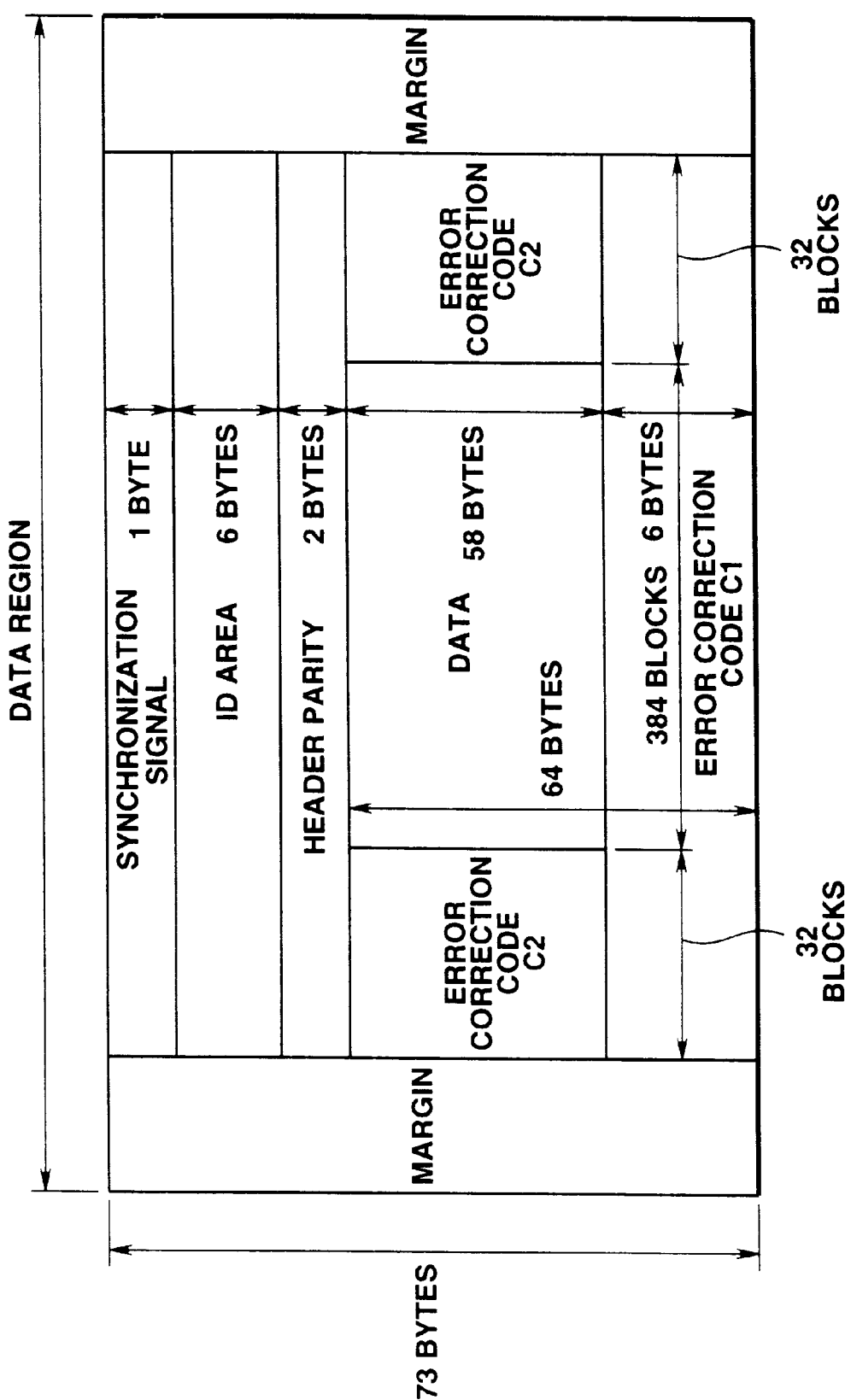
FIG. 9 is a diagram showing the data configuration of data equivalent to one track which is to be recorded on the magnetic tape by the tape streaming apparatus.

As shown in FIG. 9, the data to be recorded in the fourth sector is constructed by distributing data of 64 bytes×448 blocks to respective blocks, wherein error correction codes C2 and C1 of two dimensional configuration are added to every data piece of 58 bytes×384 blocks, i.e., 22272 bytes. Further, as shown in FIG. 9, the error correction code C1 is recorded, added to the main data of each block, and the error correction code C2 is recorded, divided into two pieces which are respectively added to both end portions of the main data region each consisting of 32 blocks.

Figure 10:
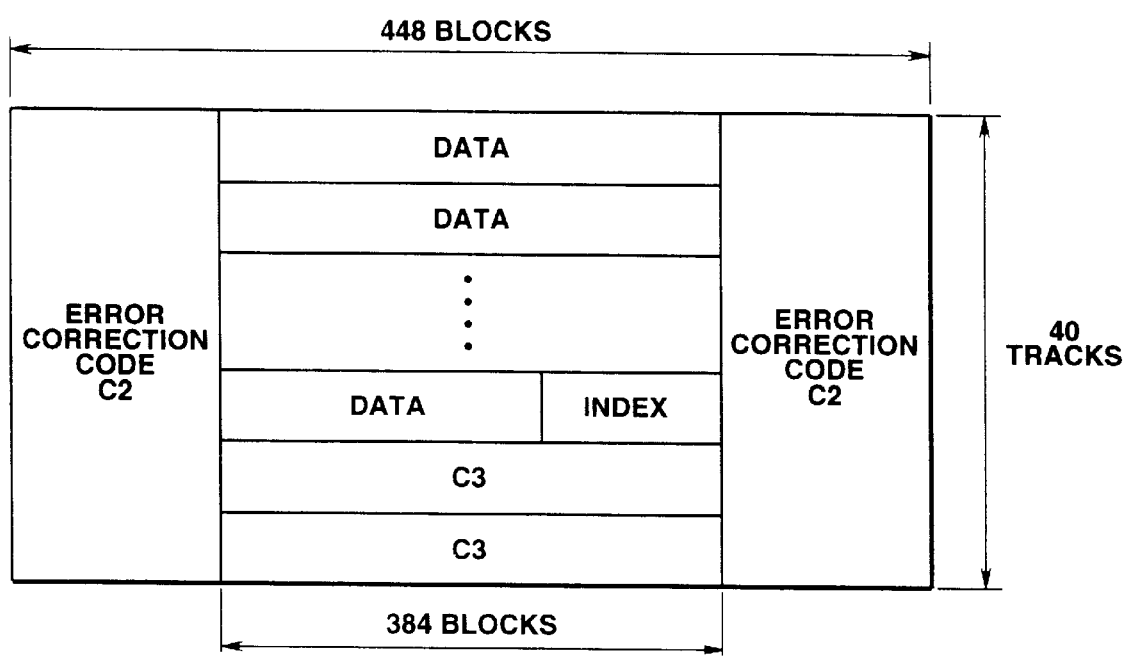
FIG. 10 is a diagram showing the data configuration of a unit of data equivalent to forty tracks which is to be recorded on the magnetic tape by the tape streaming apparatus.

Also, this tape streaming drive adopts the code configuration for error correction in which 2 tracks equivalent to 942 blocks are defined as 1 frame and 40 tracks equivalent to 20 frames are defined as 1 unit (group). As shown in FIG. 10, the error correction code C2 of a data string corresponding to the track direction is recorded, divided and arranged at both sides of the tack, and the error correction code C3 of a data string corresponding to the track width direction is assigned to the last two tracks of the 40 tracks. Note that index information for identifying a series of data is added for every unit.

Further, a separator count as pause information indicating a pause of main data, a record count indicating the number of recording sessions, area ID indicating each region defined on the tape format, a frame number indicating the absolute position of the recording unit, a group count indicating the number of recording units, a check thumb, and the like are recorded as a sub-code.

Next, the ID area A2 shown in FIG. 8B will be explained with reference to FIGS. 11 to 14.

Figure 11:
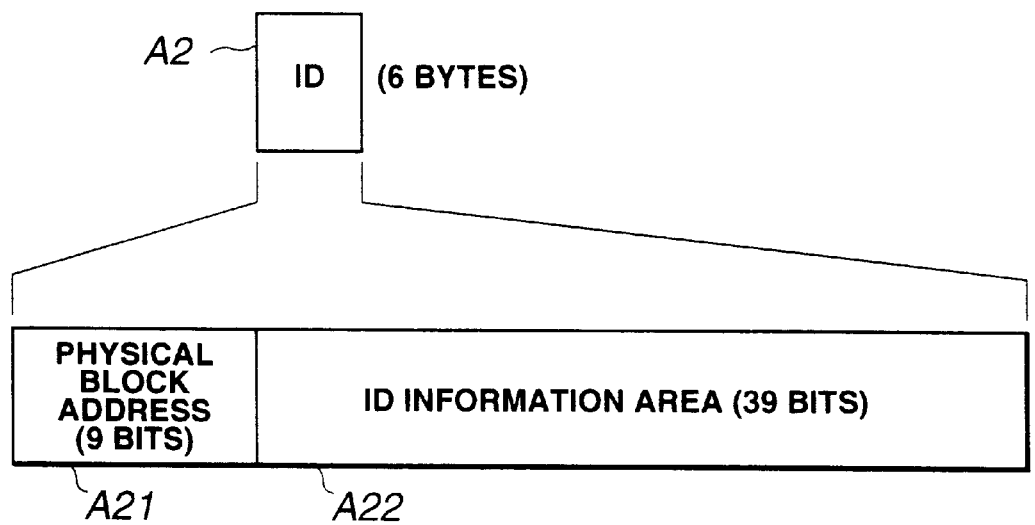
FIG. 11 is a diagram showing the data configuration of an ID area of the magnetic tape.
Figure 12:
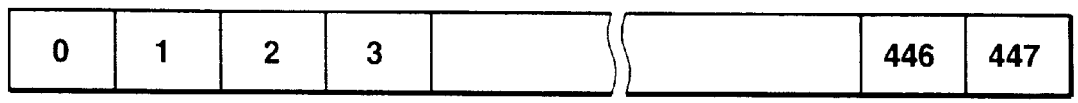
FIG. 12 is a diagram showing physical blocks address numbers on one track of the magnetic tape.

The ID area A2 is arranged in a data configuration as shown in FIG. 11, and this ID area A2 consists of a physical block address A21 of 9 bits, and a region of an ID information area A22 of 39 bits subsequent to the address A21.

As described above, since the whole data areas (A13 and A15) in one track consists of 448 blocks, the number of physical block addresses A21 included in the whole data areas is 448. Address values are assigned to these 448 physical block addresses A21 such that the value increases from 0 to 447 in a decimal system in the order from the physical block address A21 positioned at the top of one track.

In this manner, information in the ID information area A22 included in the data area in one track can be properly dealt with, for example, by the recording/reproducing apparatus. Here, the data size of the ID information area A22 included in the data area of one track is 2,184 bytes, as obtained by the following manner.

$$39(bits) \times 448(blocks) = 17{,}472(bits) = 2{,}184(bytes)$$

The kinds of items of ID area information contained in the ID information area A22 are those shown in FIG. 13, and the items of the ID area information are stored into the ID information areas A22 of 184 bytes, in accordance with predetermined rules. In addition, in consideration of achieving secure reading of ID area information by the tape streaming drive, the same kinds of ID area information items are recorded for a plurality of times for every track in accordance with a predetermined rule.

In FIG. 13, the raw format ID (16 bits) indicates the type of the basic format concerning the magnetic tape. In case of the present embodiment, for example, the raw format ID indicates the track pitch, data size of one frame, number of blocks contained in one track, data size of one block, tape length, tape thickness, material of the tape, and the like. The logical format ID (18 bits) indicates the type of recording format actually used.

The logical frame ID (8 bits) consists of last frame ID (1 bit), ECC frame ID (1 bit), and logical frame number (6 bits). The last frame ID indicates whether or not the present frame is the last frame in the group. The ECC frame ID indicates whether or not the recorded data in the data area of the present frame is ECC (error correction code).

As has been described before, one group consists of 20 frames, and the logical frame number indicates what is the ordinal number of the frame in the present group.

The partition ID (16 bits) indicates the partition number of the partition containing the present frame.

The area ID (4 bits) indicates which area the frame belongs to. The data ID indicates the type of the processing form of data based on the recording format. The N-position (4 bits) and N-repeat (4 bits) define information concerning data corresponding to the multi-recording mode.

The group count (24 bits) indicates the total number of groups up to the group which contains the frame, in the present partition. In addition, the file mark count (32 bits) indicates the total number of file marks contained in the present partition from the beginning position thereof to the group. The file mark is information indicating the pause of a data file in one partition.

The save set mark count (32 bits) indicates the total number of file marks contained in the present partition from the beginning position thereof up to the present group. The save set mark is information indicating the pause of the data save position in one partition.

The record count (32 bits) indicates the total number of records contained in the present partition from the beginning position thereof up to the present group. The absolute frame count (24 bits) indicates the total number of frames in the present partition from the beginning position thereof up to the present group. Also, undefined (reserved) regions are prepared for future addition of ID area information.

Note that the definitions of the ID area information and the number of bits assigned to each of the ID area information items are only examples, and may be changed in accordance with actual use conditions.

Next, explanation will be made of an, area ID which is the important point of the present embodiment among the ID area information items shown in FIG. 13.

FIG. 14 shows the contents of the definitions of the area ID. In this case, bit numbers (3-2-1-0) are respectively assigned to the four bits forming the area ID. When the respective values of the bit numbers (3-2-1-0) are [0000], the area ID defines the area as a device area. When the values are [0001], the area ID defines the area as a reference area. When the values are [0010], the area ID defines the area as a system log area. Values [0011] indicates that the area is undefined (reserved).

Also, values [0100], [0101], and [0110] respectively define a data area, EOD area, and an undefined area. Values [0111] define an optional device area for performing loading/unloading of the magnetic tape 12, other than the essential device area shown in FIG. 7. This optional area will be described later.

Note that, in FIG. 14, the numbers in parentheses in each column showing the values of the bits of the bit numbers (3-2-1-0) are represented in the decimal system.

Figure 16:
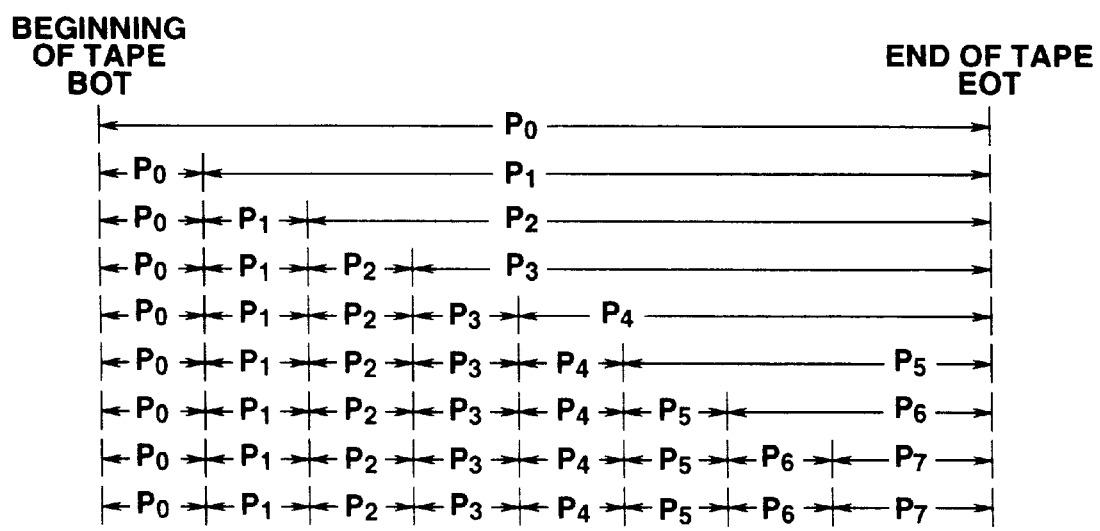
FIG. 16 is a schematic chart showing designation of a partition number when adding a partition in the tape cassette.

Further, when a new partition is appended to record new recording data in this tape streaming drive, the last partition is divided as shown in FIG. 16, and a number obtained by increasing, by one, the maximum number of the numbers of the partition or partitions which existed before the division is assigned to the partition behind the dividing portion. Specifically, if two partitions have been formed previously and numbers of $P_0$ and $P_1$ have been assigned thereto, the partition of the partition number $P_1$ is divided into two partitions which become two partitions having partition numbers $P_1$ and $P_2$. Three partitions having partition numbers $P_0$, $P_1$, and $P_2$ are therefore formed. Thus, partitions can be divided and appended sequentially.

At this time, since the numbers added to the partitions are disposed in an ascending order from the beginning side of the magnetic tape 12 toward the end side thereof, all the partition numbers are disposed in an ascendant order from the beginning side of the magnetic tape 12 toward the last end thereof by dividing the last partition and by assigning the number obtained by increasing, by one, the maximum partition number of the partitions which existed before the division, to the divided partition in the rear side.

Further, the maximum number among the numbers thus assigned to the partitions is stored into the MIC 25. That is, this number is stored at the last partition number (1 byte) in the volume information in the MIC 25.

Figure 17:
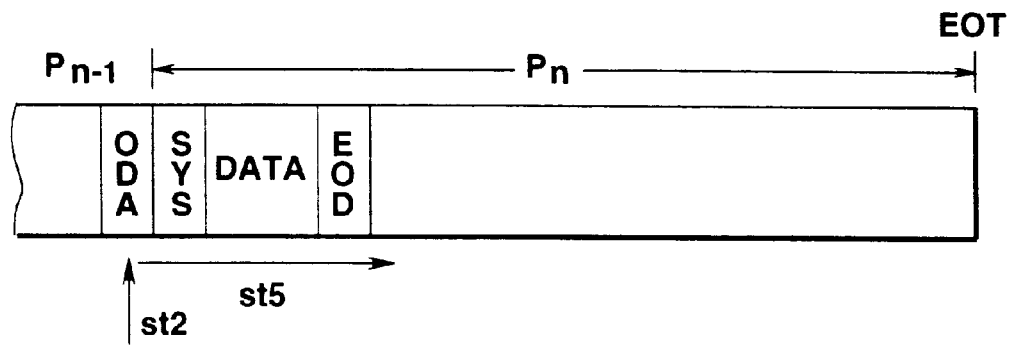
FIG. 17 is a schematic diagram showing the data configuration before a partition is added in the tape cassette.
Figure 18:
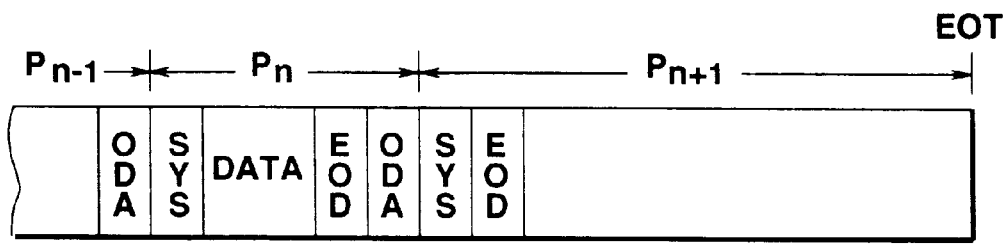
FIG. 18 is a schematic diagram showing the data configuration when a partition is added in the tape cassette.

More specifically, this kind of partition division is achieved by writing new ODA, SYS, and EOD, as shown in FIGS. 17 and 18. That is, SYS, DATA, and EOD are recorded in the last partition $P_n$ before appending a new partition, as shown in FIG. 17. To append a partition, ODA is written after the ODA of the last partition $P_n$. This ODA belongs to the partition $P_n$. Further, a new partition $P_{n+1}$ is formed by writing SYS, DATA, and EOD, or SYS and EOD after the ODA. This new partition $P_{n+1}$ is divided from the partition $P_n$. In addition, the SYS, DATA and EOD, or SYS and EOD which are newly written belong to the new partition $P_{n+1}$.

In this tape streaming drive, since a new partition can thus be appended by dividing the last partition, the entire magnetic tape 12 need not be formatted previously.

Figure 19:
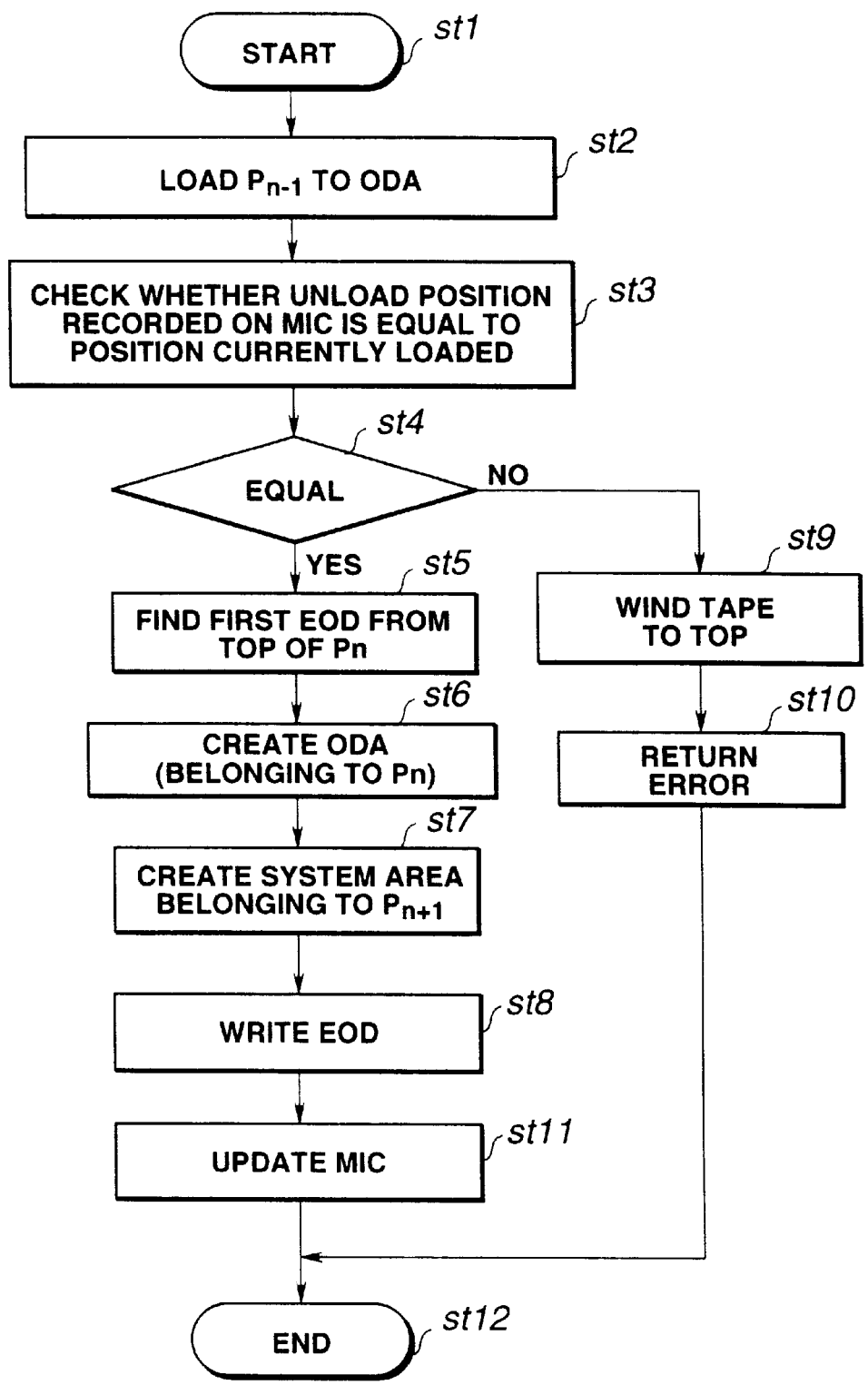
FIG. 19 is a flowchart showing the operation for adding a partition in the tape cassette.

The operation of thus appending a new partition will be explained in the form of a flowchart. As shown in FIG. 19, the operation is started in the step st1 and goes to the step st2 in which the system controller 161 starts loading of the tape cassette into the recording/reproducing section 130. This loading is carried out such that the head enters into the ODA of the partition as the partition number P(n−1). Further, in the step st3, the system controller determines whether or not the previous unloaded position is equal to the position where loading is carried out at present. This determination is made based on the ID indicating the partition number read from the ODA. If the previously unloaded position and the presently loaded position are equal to each other, the operation goes to the step st5 from the step st4. Otherwise, if these positions are not equal to each other, the operation goes to the step st9 from the step st4. In the step st9, the magnetic tape 12 is rewound to the beginning position, and an error signal is generated in the step st10. The operation then goes to the step st12 and ends.

In the step st5, the system controller 161 reads the area ID of the blocks included in the sub-code recorded from the beginning and contained in the sub-code, to find the first EOD. If this EOD is found, the operation goes to the step st6 in which the system controller 161 writes ODA belonging to the partition $P_n$ by setting area ID [0111] in the second sub-code generator section 122B. Further, the operation goes to the step st7, and the system controller 161 writes SYS belonging to the new partition $P_{n+1}$ by setting area ID [0010] in the second sub-code generator section 122B. The operation further goes to the step st8 in which the system controller 161 writes EOD belonging to the new partition $P_{n+1}$ by setting area ID [0101] in the second sub-code generator section 122B. Further, the system controller 161 goes to the step st11 and updates the contents stored in the MIC 25. The operation then goes to the step st11 and ends.

In the step st11, the system controller 161 changes, for example, the last partition number of the volume information among the data of MIC 25 read into the RAM 162, and adds a system log area for the appended partition. The updated data in the RAM 162 is transferred to the MIC 25 through the write/read control section 163 when the tape cassette is ejected from the recording/reproducing section 130.

This operation of appending a partition and the operation of deleting a partition can be carried out in accordance with SCSI commands sent from the host computer 200.

Figure 20:
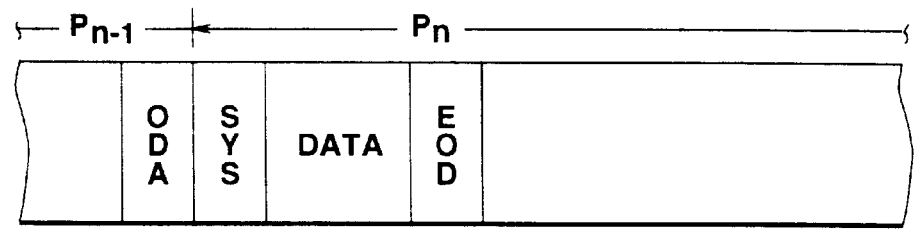
FIG. 20 is a schematic diagram showing the data configuration before enhancing the data region in the tape cassette.
Figure 21:
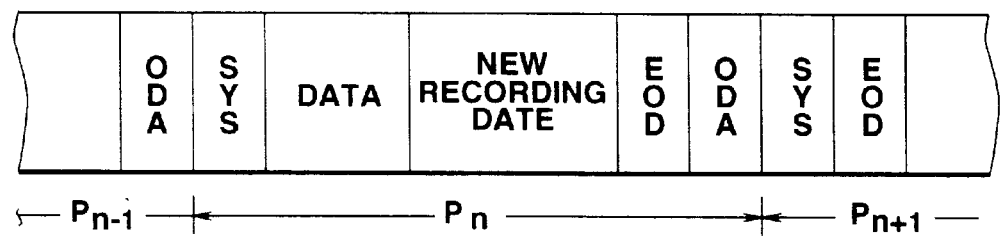
FIG. 21 is a schematic diagram showing the data configuration when enhancing the data region in the tape cassette.

Also, in this tape streaming drive, as for the last partition before appending a partition, the data region of the last partition can be enhanced. That is, in the case where SYS, DATA, and EOD are written in the last partition $P_n$ as shown in FIG. 20, a new DATA region is formed in a manner in which new recording data is overwritten on the region of the DATA as shown in FIG. 21, or new recording data (extended DATA) is overwritten from the region of EOD after the region of the DATA. At this time, the new DATA region or the region summing together the original DATA region and the region of the new recording data (Extended Data) may be larger than the original DATA region. After the new DATA region, EOD is written. Further, ODA is formed after the EOD, and SYS and EOD are formed after the ODA. A new partition $P_{n+1}$ is thereby formed as described above.

In this case, an append partition command as a SCSI command is supplied from the host computer, as shown in FIG. 29. In the page (32h) of this append partition command, the size of the new data (Extended DATA) is specified as a position size descriptor. Also, the position of the new data Extended DATA is indicated in the append partition command.

The region of the new data (Extended Data) consists of frames like the other regions. That is, each frame contains ID information and user data. It is supposed that zero is written as the user data. Of the ID information, EOD is particularly specified as the area ID. This means that the region of new data (Extended DATA) is formed by writing EOD.

Note that the region of new recording data (Extended DATA) may be formed to reserve a region for recording data later, even in the case where recording data is not actually recorded therein. That is, the object of forming new recording data (Extended DATA) is to previously secure a larger size for the partition than the present data size.

For example, suppose that first data for a first user is only 1 GB and data for a second user is also 1 GB, when a AIT cartridge of 25 GB is to be set as a capacity for containing recording data for five users. Also suppose that it is desired to set the starting position of the partition used by the second user at the position corresponding to 5 GB from the beginning of the tape so that a size of 4 GB is set as the region of new recording data (Extended DATA). In this case, there is no particular data to be written into the region of the new recording data (Extended DATA), and therefore, zero is written. As ID, the EOD area is specified.

Further, as a method of distinguishing a real data area from a region of new recording data (Extended DATA), file marks and area ID are used. Since a file mark is a mark put at a position of the boundary between areas, recovery is not possible if it is once missed. However, if an area which has the same area ID exists, this area can be found by distinguishing the real data area from a region of new recording data, even after a change point of area ID is missed. Therefore, the areas can be rather safely distinguished from each other by using area ID.

Figure 22:
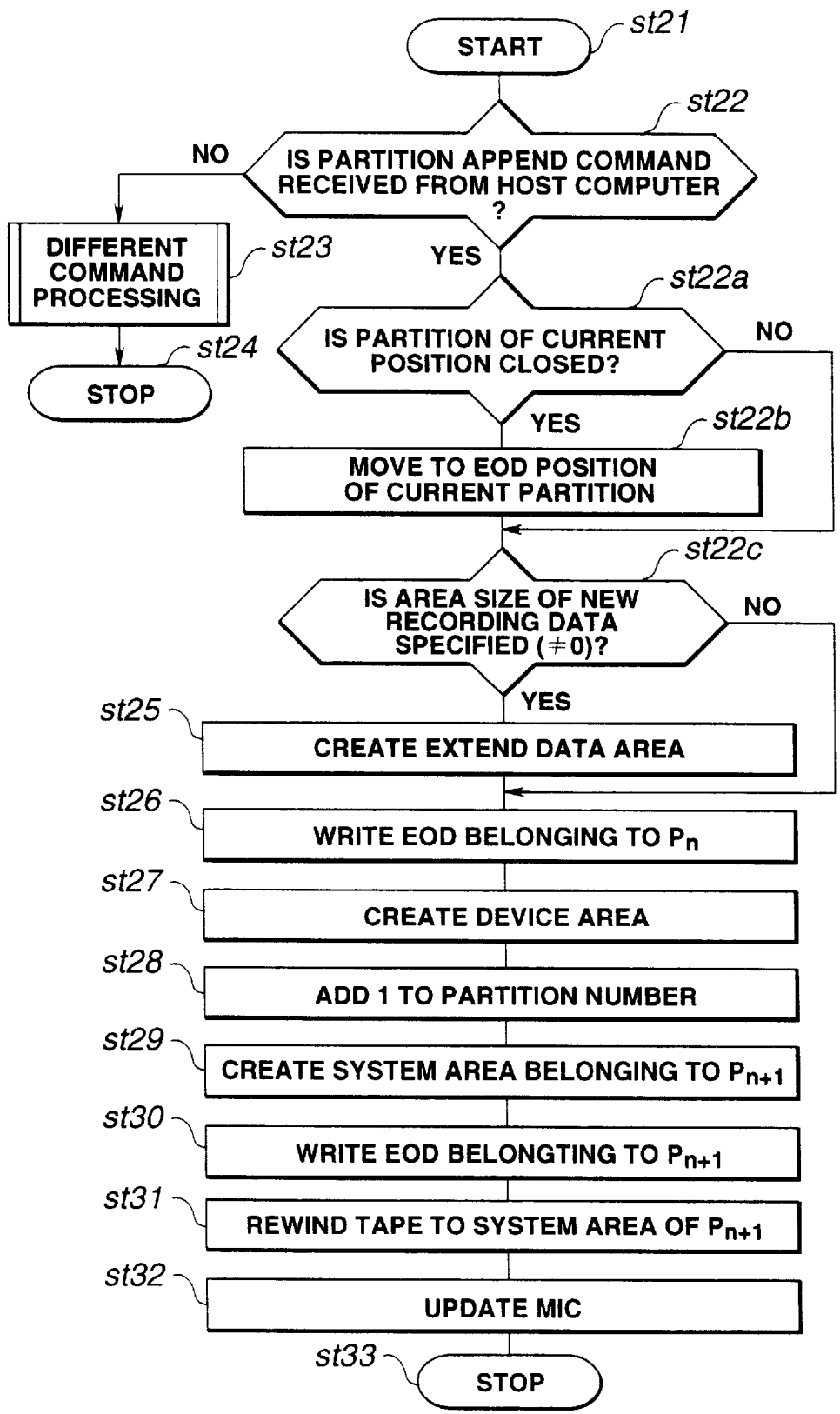
FIG. 22 is a flowchart showing the operation when enhancing the data region with respect to the tape cassette.

The operation of thus extending a data region will be explained in the form of a flowchart. As shown in FIG. 22, the operation starts from the step st21 and then goes to the step st22 in which the system controller 161 determines whether or not a command for appending a partition has been sent from the host computer 200. If the command has not been received from the host computer 200, the operation goes to the step st22a. In the step st23, processing of a different command is carried out. The operation goes to the step st24 and ends.

In the step st22a, the system controller 161 determines whether or not the partition at the present position is closed. If the partition at the present position is closed, the operation goes to the step st22b. Otherwise, if the partition at the present position is not closed, the operation goes to the step st22c.

In the step st22b, the system controller 161 the magnetic tape 12 is fed to the EOD position of the present partition, by driving the recording/reproducing section 130 while monitoring the area ID outputted from the sub-code separation section 145. The operation then goes to the step st22c.

In the step st22c, the system controller determines whether or not the size of the region of new recording data (Extended Data) has been instructed by a command from the host computer 200. If the size of the region of the new recording data (Extended DATA) has been instructed, the operation goes to the step st25.

In the step st25, the region of new recording data (Extended DATA) is formed. This new recording data (Extended DATA) belongs to the partition $P_n$. Note that the region of the new recording data (Extended DATA) may be contained in the original DATA region (i.e., the new recording data may be 0). Further, in the step st26, the system controller 161 writes EOD belonging to the partition $P_n$ by setting area ID [0101] in the second sub-code generator section 122B. Further, in the step st27, the system controller 161 writes ODA by setting area ID [0111] in the second sub-code generator section 122B. This ODA belongs to the partition $P_n$.

Next, in the step st28, the system controller 161 adds 1 to the partition ID added by the second sub-code generator section 122B to obtain the partition number of $P_{n+1}$. In the step st29, the controller 161 writes SYS belonging to the partition $P_{n+1}$ by setting area ID [0010] in the second sub-code generator section 122B. Next, in the step st30, the system controller 161 writes EOD belonging to the partition $P_{n+1}$ by setting area ID [0101] in the second sub-code generator section 122B, and thus, a partition $P_{n+1}$ is formed. Further, in the step st31, the system controller 161 rewinds the magnetic tape to SYS of the partition $P_{n+1}$ while monitoring the area ID outputted from the sub-code separation section 145. Next in the step st32, the system controller 161 changes, for example, the last partition number of the volume information shown in FIG. 28 among the data of MIC 25 read into the RAM 162 and updates the data of the MIC 25 by adding a system log area for the appended partition, or so. In the step st38, the operation ends.

Figure 23:
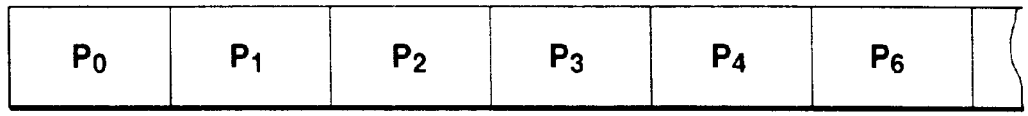
FIG. 23 is a schematic diagram showing the order of partitions before a partition is deleted in the tape cassette.
Figure 24:
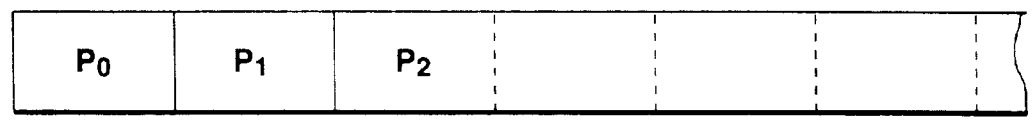
FIG. 24 is a schematic diagram showing the state of partitions when a partition is deleted in the tape cassette.

Further, in this tape streaming drive, in the case where a plurality of partitions (n partitions) are formed as shown in FIG. 23, partitions on and after a particular partition can be erased by a simple operation as shown in FIG. 24. Specifically, the total number of the partitions is n, and therefore, the number $P_n$ is recorded in the MIC 25. If the ODA belongs to the partition $P_m$ when the unloading was carried out for the last time, loading is carried out from ODA of the partition $P_m$ when loading is carried out next, and SYS of the next partition $P_{m+1}$ is searched. Therefore, at least, a next partition $P_{m+1}$ must exist. Here, by rewriting the partition number $P_n$ recorded in the MIC 25 into $P_0$ which is smaller than $P_n$ and is equal to or larger than $P_{m+1}$, all the partitions having numbers equal to or larger than $P_{0+1}$ can be merged into the partition having the number $P_0$ and thus deleted.

Specifically, $P_{m+1} \leq P_0 < P_n$ is satisfied, and for example, $P_0$ is any one of $P_2$, $P_3$, $P_4$, $P_5$, and $P_6$ from $P_2 \leq P_0 < P_7$ where n is 7 and m is 1. Where $P_0$ is $P_2$, all the partitions ($P_3$, $P_4$, $P_5$, $P_6$, and $P_7$) on and after $P_3$ can be merged into the partition $P_2$ and deleted, by starting overwriting from the DATA region of the partition $P_2$ or from the EOD region.

Likewise, where $P_0$ is $P_3$, all the partitions ($P_4$, $P_5$, $P_6$, and $P_7$) on and after $P_4$ can be merged into the partition $P_2$ and deleted, by starting overwriting from the DATA region of the partition $P_3$ or from the EOD region.

This deletion of partitions from the tape cassette is carried out based on a delete partition command as a SCSI command from the host computer 200.

FIG. 30 shows the data configuration of the delete partition command.

In this case, the page code indicates a delete partition command (33h), and the page length indicates the length (byte or bytes) of the data contents to be recorded subsequently.

As actual data contents of the command, the partition to be deleted is specified as an indicate partitions number. This instructs that all the partitions after the partition specified by the indicate partition number should be deleted. That is, the specified number corresponds to the number of the last partition of the partitions that will remain.

Figure 31:
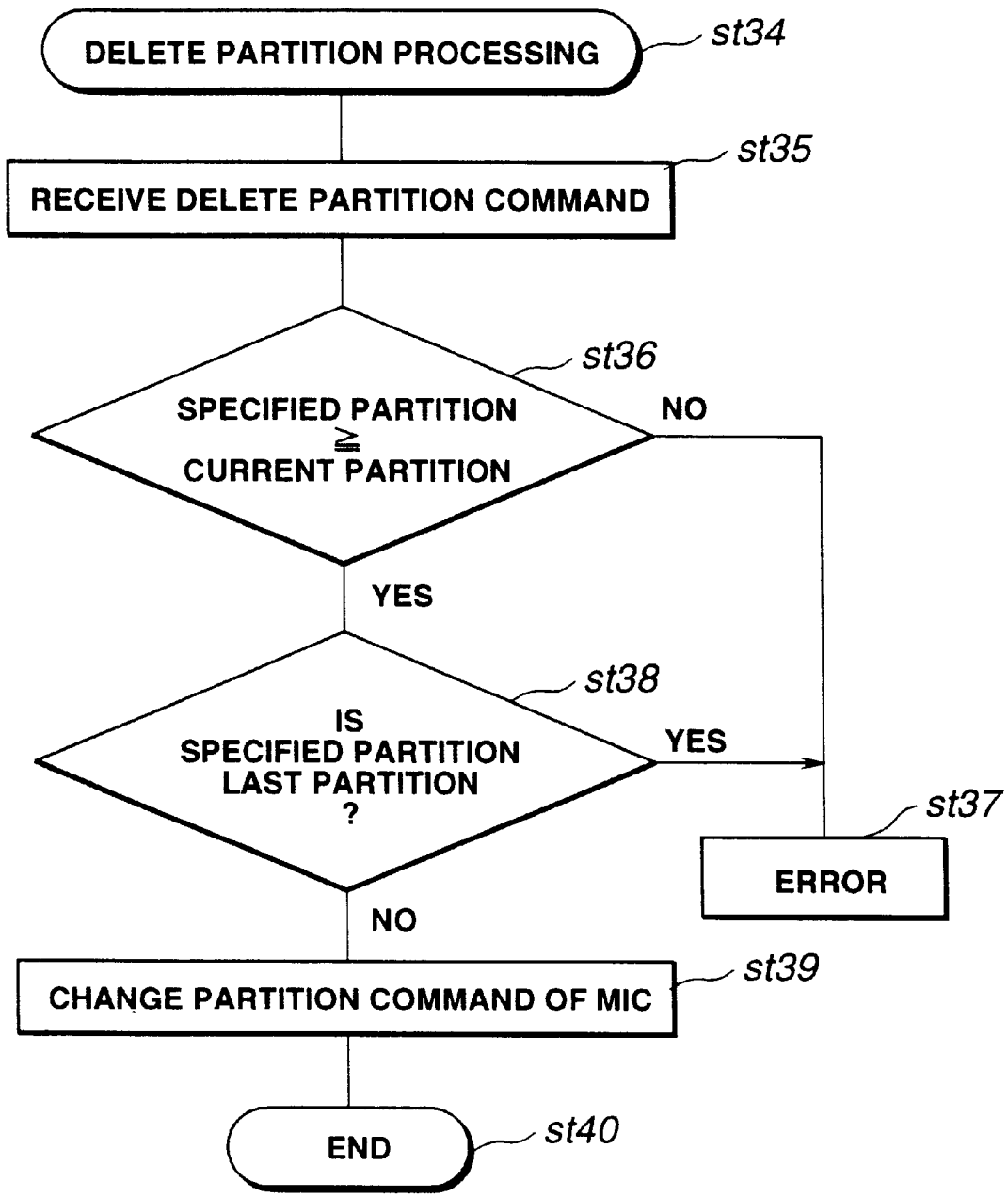
FIG. 31 is a flowchart showing the procedure of delete partition processing.

Processing to be made by the system controller when this kind of format command is issued is as shown in FIG. 31.

Specifically, in the case where the a delete partition command is received through the SCSI interface 100, the system controller starts delete partition processing in the step st34, and takes in the command in the step st35. The operation goes to the step st36. In this step st36, the system controller 161 determines whether or not the partition specified by the indicate partition number of the delete partition command is a partition after the partition which is active at present.

If the specified partition number is smaller than the number of the partition which is active at present, the operation goes to the step st37 and an error is admitted. Deletion processing is not carried out in this case.

The steps st36 and st37 carries out processing for permitting deletion only with respect to the partitions after the partition which is active at the present time points to.

If the partition number specified by the delete partition command is the number of a partition after the partition which is active at present, the operation goes to the step st38, and whether or not the partition specified by the indicate partition number is the last partition of the partitions which exist at present. If the number specifies the last partition, there is no partition to be deleted and an error is admitted in the step st37.

If it is determined that the specified partition is not the last partition, data of the MIC 25 is updated to execute deletion in the step st39. The operation goes to the step st40 and ends. Specifically, management information is updated so as to indicate a condition that the partitions on and after the partition next to the partition specified by the specified partition number. For example, the system controller 161 changes the last partition number of the volume information of the MIC 25 read in the RAM 162 and invalidates the system log area with respect to one or plural partitions which have been deleted.

Thus, partitions on the magnetic tape 12 are deleted by updating processing on the management information in the MIC 25.

An example of the operation of deleting partitions will now be explained schematically with reference to FIGS. 32 to 37.

Figure 32:
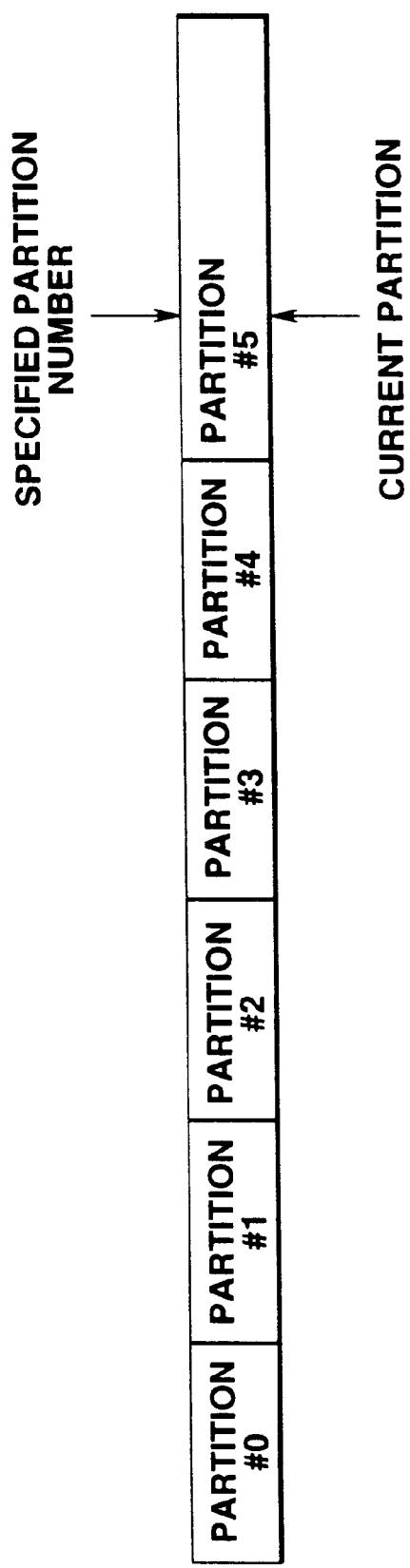
FIG. 32 is a schematic diagram showing a state before processing a case where the partition rendered active and the partition designated by an indicate partition number are both the partition just before the last partition.

FIG. 32 shows a case in which the indicate partition number of the delete partition command specifies the partition #5 when the partition #5 is active. Also, the partition #5 is the last partition.

In this case, the operation goes to the step st389 from the step st36. However, in the step st38, an error is admitted for the delete partition command since the last partition is specified. That is, deletion of partitions is not carried out.

FIG. 33A shows a case in which the indicate partition number of the delete partition command specifies the partition #4 when partitions exists up to #5 and the partition #4 is activated.

This is a valid command for deleting partitions after the partition #4, and the processing shown in FIG. 31 goes to the step st39. Management information in the MIC 25 is then updated such that the partition #5 is deleted as shown in FIG. 33B.

FIG. 34A shows a case in which the indicate partition number of the delete partition command specifies the partition #0 when partitions exists up to #5 and the partition #0 is activated.

This is also a valid command for deleting partitions after the partition #0, and the processing shown in FIG. 31 goes to the step st39. Management information in the MIC is then updated such that the partitions #1 to #5 are deleted as shown in FIG. 34B.

Figures 35A, 35B:
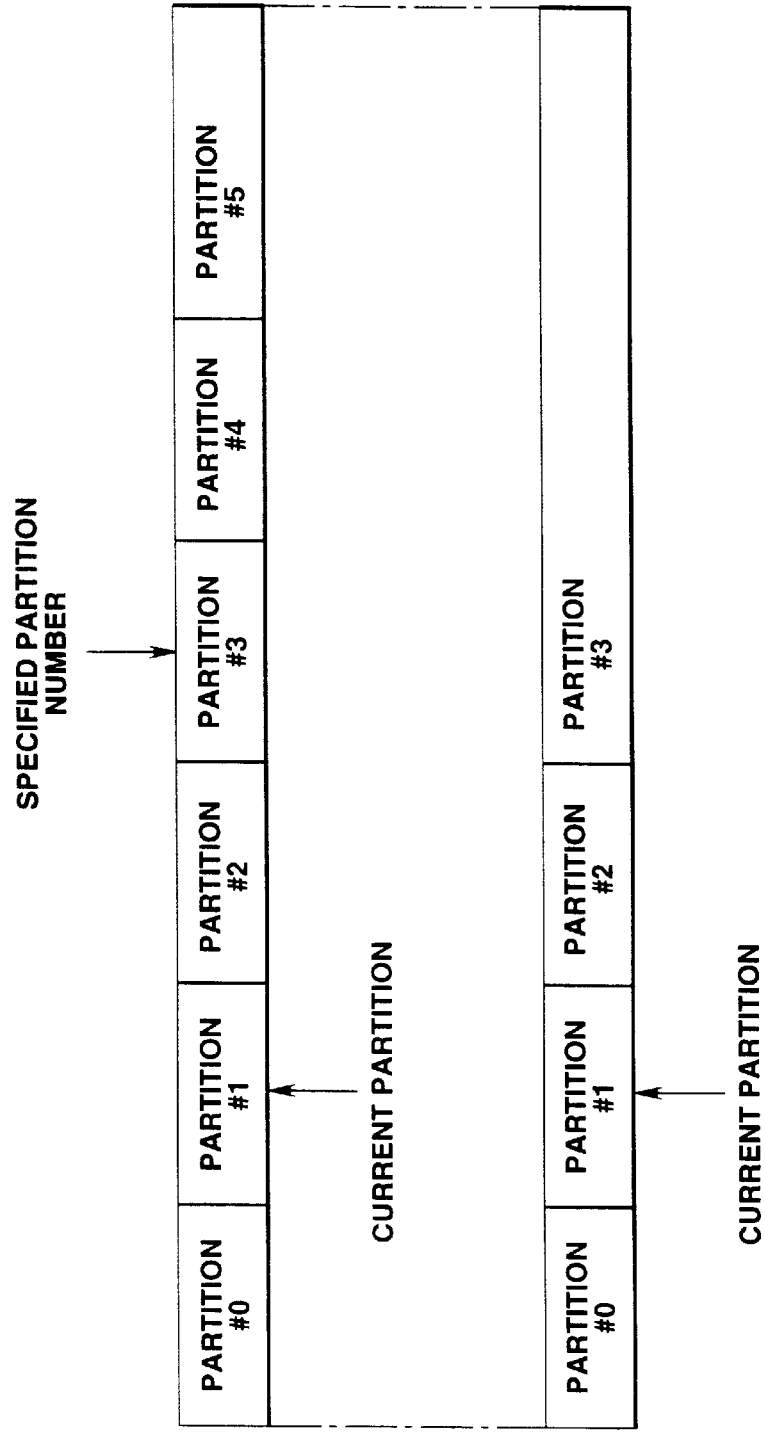
FIG. 35A is a schematic diagram showing a state before processing a case where the partition rendered active is located before the partition designated by an indicate partition number.
FIG. 35B is a schematic diagram showing a state after processing a case where the partition rendered active is located before the partition designated by an indicate partition number.

FIG. 35A shows a case in which the indicate partition number of the delete partition command specifies the partition #3 when partitions exists up to #5 and the partition #1 is activated.

This is also a valid command for deleting partitions after the partition #1, and the processing shown in FIG. 31 goes to the step st39. Management information in the MIC is then updated such that the partitions #4 and #5 are deleted as shown in FIG. 35B.

Figure 36:
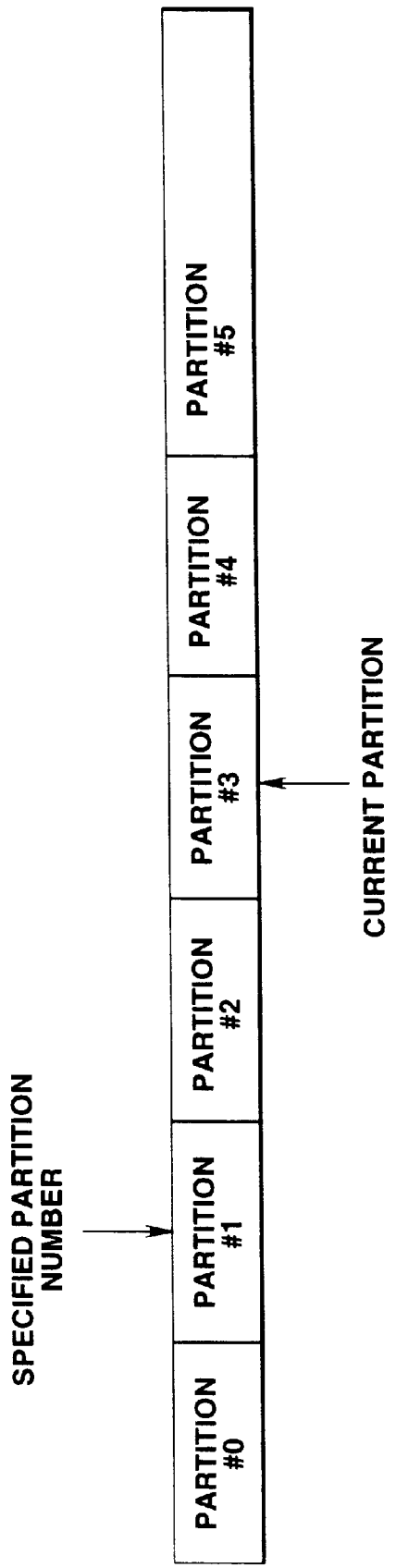
FIG. 36 is a schematic diagram showing a case where the partition rendered active is located after the partition designated by an indicate partition number.

FIG. 36 shows a case in which the indicated partition number of the delete partition command specifies the partition #1 when partitions exists up to #5 and the partition #3 is activated.

In this case, a negative determination result is obtained in the step st36 in FIG. 31, and an error is admitted so that deletion of partitions is not executed.

Figure 37:
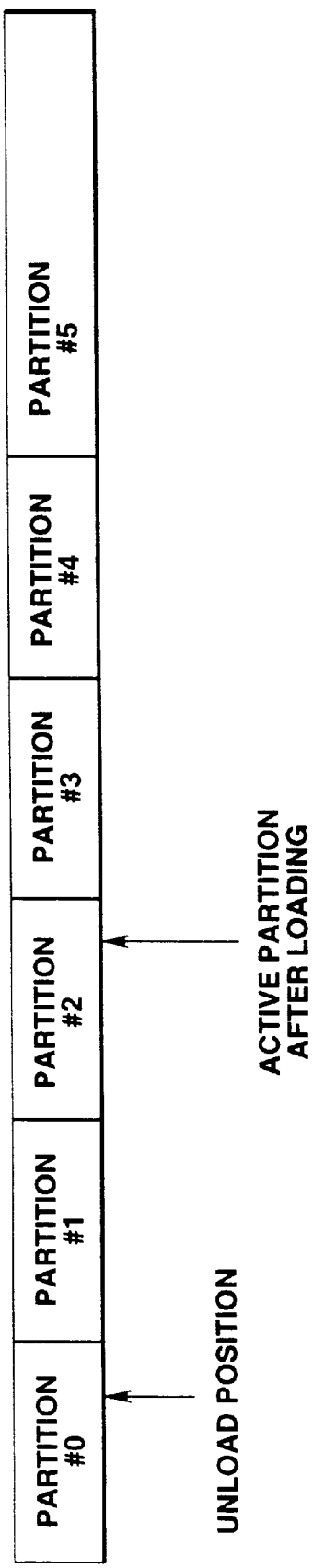
FIG. 37 is a schematic diagram showing a case where a delete partition command is issued with the tape cassette not loaded.

FIG. 37 shows a case in which a delete partition command is issued with the tape cassette not loaded (e.g., with the magnetic tape not wound on the rotation drum). Although the tape position in this unloaded condition is in the optional area at the rear end of the partition #1, subsequent loading is completed thereafter at the system area in the partition #2. That is, at the time point of completion of loading, the partition #2 is active.

In this case, therefore, the delete partition command is determined as being valid and deletion is executed if the indicate partition number thereof specifies any one of the partitions #2 to #4. Otherwise, if the indicated partition number specifies any one of the partitions #0, #1, and #5, the command is determined as being invalid and deletion is not executed.

Figure 25:
FIG. 25 is a schematic diagram showing another embodiment of the order of the numbers of the partitions in the tape cassette.
Figure 26:
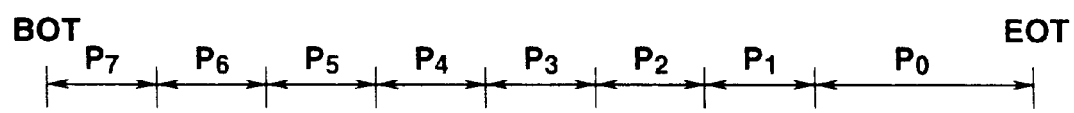
FIG. 26 is a schematic diagram showing the order of partitions in a conventional tape cassette.

In this tape streaming drive, even if the numbers of the partitions are not arranged in an ascending order on the loaded magnetic tape 12, the last partition is divided when a partition is appended, and a number obtained by increasing, by one, the maximum number of the numbers assigned to the partition which have existed before the division is assigned to the partition in the rear side of the dividing position. For example, suppose a case where a magnetic tape is loaded in which eight partitions have already been formed as shown in FIG. 25 and numbers $P_7$, $P_6$, $P_5$, $P_4$, $P_3$, $P_2$, $P_1$, and $P_0$ are assigned to those partitions in this descending order. In this case, when a partition is appended, the last partition $P_0$ is divided into partitions $P_0$ and $P_8$. The number of the last partition is $P_0$. In the case of appending further partitions thereto, the last partition is divided for each time so that partitions assigned by numbers $P_9$, $P_{10}$, $P_{11}$, and $P_{12}$ in this ascending order can be appended sequentially.

As described above, the tape cassette according to the present invention comprises a tape-like recording medium in which recording data is recorded in each of at least two numbered partitions, and a memory means for storing auxiliary information concerning each of the partitions, in addition to the tape-like recording media. Further, the numbers respectively assigned to the partitions are arranged in an ascending order from the begging side of the tape-like recording medium toward the end side thereof. The memory means stores at least the maximum number among the numbers assigned to the partitions.

Further, the tape recording apparatus according to the present invention is a tape recording apparatus which records recording data onto a tape-like recording medium using the tape cassette as described above, and is characterized in that the last partition is divided when a partition is appended and a number obtained by increasing the maximum number among the numbers assigned to the partitions which have existed before the division is assigned to the partition in the rear side of the dividing position.

Thus, the present invention is capable of providing a tape cassette and a tape recording apparatus by which deletion and appending of partitions can be freely achieved, the total number of partitions formed in the tape-like recording medium can be easily estimated, and pre-formatting is not required.

What is claimed is:

1. A tape recording apparatus for recording data onto a tape-like recording medium of a tape cassette including the tape-like recording medium divided into at least two numbered partitions in each of which recording data is recorded, and memory means for storing auxiliary information concerning each of the partitions, independently from the tape-like recording medium, comprising:

input means for inputting recording data to be recorded on the tape-like recording medium;

read means for reading the auxiliary information from the memory means;

recording control means for recording the recording data inputted by the input means, onto the tape-like recording medium, based on the auxiliary information obtained by the read means;

auxiliary information generation means for generating new auxiliary information issued when the recording data is recorded onto the tape-like recording medium; and write means for writing the new auxiliary information generated by the auxiliary information generation means, into the memory means, wherein the recording control means appends a new partition in such a manner in which a last partition is divided by creating a device area in the last partition for loading/unloading the tape-like recording medium, and a number obtained by increasing, by one, a maximum number among partition numbers assigned to the partitions before division is assigned to the appended partition after a dividing part where the last partition is divided.

2. The tape recording apparatus according to claim 1, wherein the recording control means assigns partition numbers to partitions in an ascending order from a beginning side of the tape-like recording medium toward an end side thereof.

3. The tape recording apparatus according to claim 1, wherein the write means stores a maximum number among partition numbers assigned to partitions, into the memory means.

4. The tape recording apparatus according to claim 1, wherein each of the partitions has a system area where use history information is recorded, a data area where the recording data is recorded, and an end of data area which indicates an end of the data area, and when appending a partition, the recording control means feeds the tape-like recording medium until an end of data area contained in a last partition is found, and forms a device area for loading/unloading the tape-like recording medium and a system area and an end of data area of the partition to be appended, sequentially after the found end of data area.

5. The tape recording apparatus according to claim 4, wherein the read means reads unload information of a last time, and the recording control means appends a new partition only when a device area of a loaded tape-like recording medium is equal to an unload position.

6. The tape recording apparatus according to claim 1, wherein each of the partitions includes a system area where use history information is recorded, a data area where the recording data is recorded and an end of data area which indicates an end of the data area, when appending a partition, the recording control means feeds the tape-like recording medium to a position of an end of data area contained in a partition at a present position, forms an extended data area corresponding to a size of a region specified by a command supplied from outside, and sequentially forms a device area for loading/unloading the end of data area contained in the partition at the present position and the tape-like recording medium, and a system area and an end of data area of the partition to be appended.

7. The tape recording apparatus according to claim 6, wherein the recording control means forms the end of data area contained in the partition at the present position as the extended data area.

8. The tape recording apparatus according to claim 6, wherein the write means updates the auxiliary information so as to store the maximum number among partition numbers assigned to the partitions of the tape-like recording medium including the appended partition.

9. A tape recording apparatus for recording data onto a tape-like recording medium of a tape cassette including the tape-like recording medium divided into at least two numbered partitions including a last partition extending to an end of the tape-like recording medium, in each of which recording data is recorded, and memory means for storing auxiliary information concerning each of the partitions, independently from the tape-like recording medium, comprising:

read means for reading the auxiliary information from the memory means;

recording control means for erasing recording data on the tape-like recording medium, based on the auxiliary information read by the read means;

auxiliary information updating means for updating the auxiliary information when the recording data recorded on the tape-like recording medium is erased; and write means for writing new auxiliary information updated by the auxiliary information updating means, wherein, only when the partition specified by a delete command supplied from outside is the partition on or after the partition presently used and the specified partition is not the last partition, the recording control means deletes a partition or partitions after the specified partition and sets the specified partition as the last partition.

10. The tape recording apparatus according to claim 9, wherein the auxiliary information includes number information indicating a maximum number among partition numbers assigned to partitions formed on the tape-like recording medium, and the auxiliary information updating means updates the number information in accordance with deletion of a partition.

11. The tape recording apparatus according to claim 1, wherein the recording control means assigns the partition numbers in an ascending order from a beginning side of the tape-like recording medium toward an end side thereof.

* * * * *